(12) United States Patent
Gao et al.

(10) Patent No.: US 11,290,724 B2
(45) Date of Patent: Mar. 29, 2022

(54) INTER PREDICTION METHOD AND APPARATUS, AND TERMINAL DEVICE

(71) Applicant: HUAWEI TECHNOLOGIES CO., LTD., Shenzhen (CN)

(72) Inventors: Shan Gao, Dongguan (CN); Weiwei Xu, Hangzhou (CN); Huanbang Chen, Shenzhen (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/894,268

(22) Filed: Jun. 5, 2020

(65) Prior Publication Data

US 2020/0304801 A1 Sep. 24, 2020

Related U.S. Application Data

(63) Continuation of application No. PCT/CN2018/119389, filed on Dec. 5, 2018.

(30) Foreign Application Priority Data

Dec. 8, 2017 (CN) .......................... 201711297953.9

(51) Int. Cl.
*H04N 19/139* (2014.01)
*H04N 19/176* (2014.01)
(Continued)

(52) U.S. Cl.
CPC ......... *H04N 19/139* (2014.11); *H04N 19/176* (2014.11); *H04N 19/56* (2014.11); *H04N 19/573* (2014.11)

(58) Field of Classification Search
CPC .. H04N 19/139; H04N 19/167; H04N 19/176; H04N 19/463; H04N 19/513;
(Continued)

(56) References Cited

U.S. PATENT DOCUMENTS 5,491,523 A * 2/1996 Sato ....................... H04N 19/51
348/699
5,587,741 A * 12/1996 Kim ..................... H04N 19/523
375/240.17
(Continued)

FOREIGN PATENT DOCUMENTS

CN 1592421 A 3/2005
CN 101340578 A 1/2009
(Continued)

OTHER PUBLICATIONS

ITU-T H.264 Telecommunication Standardization Sector of ITU (Apr. 2017), Series H: Audiovisual and Multimedia Systems, Infrastructure of audiovisual services Coding of moving video, Advanced video coding for generic audiovisual services, Apr. 2017. total 812 pages.

(Continued)

*Primary Examiner* — Christopher S Kelley
*Assistant Examiner* — Ana Picon-Feliciano
(74) *Attorney, Agent, or Firm* — Hauptman Ham, LLP

(57) ABSTRACT

An inter prediction method includes parsing, by a processor, a bitstream to obtain a location of a target adjacent image block of a current image block. The method further includes obtaining a preset correspondence between an adjacent image block location and a motion vector precision, wherein in the preset correspondence, locations of at least two adjacent image blocks correspond to different motion vector precisions. The method further includes determining, based on the location of the target adjacent image block and the preset correspondence, a target motion vector precision corresponding to the target adjacent image block. The method further includes determining a motion vector predictor of the current image block based on the location of the
(Continued)

target adjacent image block and the target motion vector precision.

20 Claims, 8 Drawing Sheets

(51) Int. Cl.
*H04N 19/56* (2014.01)
*H04N 19/573* (2014.01)
(58) Field of Classification Search
CPC ...... H04N 19/52; H04N 19/523; H04N 19/53; H04N 19/56; H04N 19/573; H04N 19/61
USPC ...................................... 375/240.12
See application file for complete search history.

(56) References Cited

U.S. PATENT DOCUMENTS

| | | | |
|---|---|---|---|
| 2006/0126741 A1* | 6/2006 | Saito | H04N 5/145 375/240.16 |
| 2011/0206125 A1 | 8/2011 | Chien et al. | |
| 2012/0051431 A1* | 3/2012 | Chien | H04N 19/159 375/240.16 |
| 2012/0057632 A1 | 3/2012 | Sato | |
| 2012/0093226 A1* | 4/2012 | Chien | H04N 19/139 375/240.16 |
| 2012/0207220 A1 | 8/2012 | Kim et al. | |
| 2012/0314771 A1 | 12/2012 | Lim et al. | |
| 2014/0064372 A1* | 3/2014 | Laroche | H04N 19/139 375/240.16 |
| 2015/0131728 A1* | 5/2015 | Wang | H04N 19/513 375/240.16 |
| 2015/0195562 A1 | 7/2015 | Li et al. | |

FOREIGN PATENT DOCUMENTS

| | | |
|---|---|---|
| CN | 102377992 A | 3/2012 |
| CN | 102611886 A | 7/2012 |
| CN | 102783149 A | 11/2012 |
| CN | 103561263 A | 2/2014 |
| CN | 106165419 A | 11/2016 |
| CN | 106331703 A | 1/2017 |
| CN | 107113442 A | 8/2017 |
| KR | 20130002221 A | 1/2013 |
| WO | 2016119104 A1 | 8/2016 |

OTHER PUBLICATIONS

Chih-Wei Hsu et al. Description of SDR video coding technology proposal by MediaTek, Joint Video Experts Team (JVET) of ITU-T SG 16 WP 3 and ISO/IEC JTC 1/SC 29/WG 11, JVET-J0018, 10th Meeting: San Diego, US, Apr. 3, 2018, total 3 pages. XP030151179.
Huanbang Chen:"Description of SDR, HDR and 360 video coding technology proposal by Huawei, GoPro, HiSilicon, and Samsung", buJoint Video Exploration Team (JVET) of ITU-T SG 16 WP 3 and ISO/IEC JTC 1/SC 29/WG 11, JVET-J0025, 10th Meeting: San Diego, US, Apr. 3, 2018. total 3 pages. XP030151191.
Chiu Vi-Jen et al: "Decoder-side Motion Estimation and Wiener filter for HEVC", 2013 Visual Communications and Image Processing (VCIP), IEEE, Nov. 17, 2013 (Nov. 17, 2013), pp. 1-6, XP032543658.
Y-J Chiu (Intel) et al: "TE1: Report of self derivation of motion estimation improvement in TMuC", Joint Collaborative Team on Video Coding (JCT-VC) of ITU-T SG16 WP3 and ISO/IEC JTC1/SC29/WG11, JCTVC-C127, WG11 No. m18151, 3rd Meeting: Guangzhou, CN, Oct. 7-15, 2010, total 12 pages. XP030225840.
Fujibayashi (NTT Docomo) A et al: "CE9: 3.2d Simplified motion vector prediction", Joint Collaborative Team on Video Coding (JCT-VC) of ITU-T SG16 WP3 and ISO/IEC JTC1/SC29/WG11, JCTVC-D231, 4th Meeting: Daegu, Korea, Jan. 20-28, 2011, total 5 pages. XP030008271.
Extended European Search Report issued in corresponding European Patent Application No. 18885344.4, dated Jul. 14, 2020, European Patent Office, Munich, Germany.
Chinese Office Action issued in corresponding Chinese Application No. 201711297953.9, dated Nov. 22, 2021, pp. 1-19.

\* cited by examiner

INTER PREDICTION METHOD AND APPARATUS, AND TERMINAL DEVICE

CROSS-REFERENCE TO RELATED APPLICATIONS

This application is a continuation of International Application No. PCT/CN2018/119389, filed on Dec. 5, 2018, which claims priority to Chinese Patent Application No. 201711297953.9, filed on Dec. 8, 2017, the disclosures of the aforementioned applications are hereby incorporated by reference in their entireties.

TECHNICAL FIELD

This application relates to the video encoding and decoding field, and more specifically, to an inter prediction method and apparatus, and a terminal device.

BACKGROUND

In a solution for inter prediction of an image block, a candidate motion vector predictor list is first generated, and then a target motion vector is selected from the candidate motion vector predictor list to perform motion vector prediction on a to-be-predicted image block. The following describes, in detail from perspectives of an encoder side and a decoder side, an inter prediction process performed by using this solution.

Encoder Side:

First, with first motion vector precision, a candidate motion vector predictor list (the list usually includes two candidate motion vector predictors) is generated based on a motion vector of a usable adjacent image block (an adjacent image block that has a motion vector is referred to as a usable adjacent image block) of a current image block. Next, the encoder side selects a target motion vector from the candidate motion vector predictor list to perform motion vector prediction on the current image block. Finally, the encoder side writes the first motion vector precision and an index value of the target motion vector in the candidate motion vector predictor list into a bitstream, and transmits the bitstream to the decoder side.

Decoder Side:

First, the decoder side parses the bitstream to obtain the first motion vector precision and the index value of the target motion vector in the candidate motion vector predictor list. Next, the decoder side generates the candidate motion vector predictor list with the first motion vector precision based on the motion vector of the usable adjacent image block of the current image block. Then, the decoder side selects the target motion vector from the candidate motion vector predictor list based on the index value of the target motion vector in the candidate motion vector predictor list. Finally, the decoder side performs motion vector prediction on the current image block based on the target motion vector.

When this solution is used for inter-frame prediction, the encoder side needs to transmit the first motion vector precision and the index value of the target motion vector in the candidate motion vector predictor list to the decoder side; and the decoder side further needs to regenerate the candidate motion vector predictor list with the first motion vector precision. As a result, complexity of inter prediction is relatively high.

SUMMARY

One or more embodiments of this application provides an inter prediction method and apparatus, and a terminal device, to reduce complexity of inter prediction.

According to a first embodiment, an inter prediction method is provided. The method includes: parsing a bitstream to obtain a location of a target adjacent image block of a current image block; obtaining a preset correspondence between an adjacent image block location and motion vector precision, where in the correspondence, locations of at least two adjacent image blocks are corresponding to different motion vector precision; determining, based on the location of the target adjacent image block and the correspondence, target motion vector precision corresponding to the target adjacent image block; and determining a motion vector predictor of the current image block based on the location of the target adjacent image block and the target motion vector precision.

In some embodiments, the adjacent image block may be an image block adjacent to the current image block in time domain or may be an image block adjacent to the current image block in space domain.

It should be understood that the correspondence may specifically be used to indicate required precision of the motion vector predictor of the current image block when motion vector prediction is performed on the current image block by using adjacent image blocks at different locations.

The motion vector precision corresponding to the adjacent image block location may include a ¼ pixel, a ½ pixel, an integer pixel, 2 pixels, 4 pixels, 8 pixels, and the like.

The inter prediction method may be performed by an encoder side, the bitstream may be obtained through encoding performed by the encoder side on a video, and the bitstream may be transmitted by the encoder side to a decoder side directly.

It should be understood that the location of the target adjacent image block may be determined when the encoder side encodes an image.

In some embodiments, the parsing a bitstream to obtain a location of a target adjacent image block of a current image block specifically includes: parsing the bitstream to obtain a target index value. The target index value is used to indicate the location of the target adjacent image block.

It should be understood that there may be a one-to-one correspondence between an adjacent image block location and an index value. The encoder side may write the target index value corresponding to the location of the target adjacent image block into the bitstream, so that the decoder side parses the bitstream to obtain the target index value, and then determines the location of the target adjacent image block based on the target index value and the correspondence between an index value and an adjacent image block location.

In some embodiments of this application, after the location of the target adjacent image block is obtained, the target motion vector precision corresponding to the target adjacent image block may be determined directly based on the correspondence between an adjacent image block location and motion vector precision, and then motion vector prediction can be performed based on the location of the target adjacent image block and the target motion vector precision. This can reduce complexity of inter prediction.

In some embodiments, the preset correspondence between an adjacent image block location and motion vector precision may be written into the encoder side and the decoder side in advance.

With reference to the first embodiment, in some implementations of the first embodiment, in the correspondence, a location of an $i^{th}$ adjacent image block is corresponding to $j^{th}$ motion vector precision, the $j^{th}$ motion vector precision is motion vector precision that is most frequently used when image motion vector prediction is performed at the location of the $i^{th}$ adjacent image block within a preset statistical period, and the $i^{th}$ adjacent image block is any one of a plurality of adjacent image blocks corresponding to a to-be-predicted image block.

The motion vector precision that is most frequently used when image motion vector prediction is performed within the preset statistical time is used as motion vector precision corresponding to an adjacent image block location. In this way, motion vector precision corresponding to each adjacent image block location can be determined relatively properly.

The to-be-predicted image block may be any image block on which motion vector prediction is performed during the motion vector prediction. The plurality of adjacent image blocks corresponding to the to-be-predicted image block may be some image blocks adjacent to the to-be-predicted image block, or the plurality of adjacent image blocks corresponding to the to-be-predicted image block may be some image blocks that are used when motion vector prediction is performed on the to-be-predicted image block.

In some embodiments, the preset statistical period (or the preset statistical time) may be a time required for completion of motion vector prediction on a specific quantity of video images (for example, 100 thousand frames of video images).

In some embodiments, the preset statistical period may alternatively be a fixed time period, for example, one month or three months.

In some embodiments, the preset statistical period may alternatively be a time required for reaching a preset quantity of statistical times (for example, 100 thousand times).

With reference to the first embodiment, in some implementations of the first embodiment, the determining a motion vector predictor of the current image block based on the location of the target adjacent image block and the target motion vector precision includes: when there is a motion vector at the location of the target adjacent image block, adjusting precision of the motion vector of the target adjacent image block based on the target motion vector precision, to obtain an adjusted motion vector, where precision of the adjusted motion vector is the target motion vector precision; and determining the adjusted motion vector as the motion vector predictor of the current image block.

In this application, when the target adjacent image block has a motion vector, precision of the motion vector of the target adjacent image block is directly adjusted. This can quickly determine the motion vector predictor of the current image block, thereby reducing complexity of inter prediction.

It should be understood that, when the target adjacent image block has a motion vector, it can be considered that the target adjacent image block is usable; when the target adjacent image block has no motion vector, it can be considered that the target adjacent image block is unusable.

With reference to the first embodiment, in some implementations of the first embodiment, the determining a motion vector predictor of the current image block based on the location of the target adjacent image block and the target motion vector precision includes: when there is a motion vector at the location of the target adjacent image block, determining whether precision of the motion vector of the target adjacent image block is the target motion vector precision; and when the precision of the motion vector of the target adjacent image block is the target motion vector precision, determining the motion vector of the target adjacent image block as the motion vector predictor of the current image block; or when the precision of the motion vector of the target adjacent image block is not the target motion vector precision, adjusting the precision of the motion vector of the target adjacent image block based on the target motion vector precision, to obtain an adjusted motion vector, where precision of the adjusted motion vector is the target motion vector precision; and determining the adjusted motion vector as the motion vector predictor of the current image block.

When the motion vector predictor of the current image block is being determined based on the motion vector of the target adjacent image block, whether the precision of the target adjacent image block is the target motion vector precision is determined in advance, so that when the precision of the target adjacent image block is the target motion vector precision, the motion vector of the target adjacent image block can be determined as the motion vector predictor of the current image block directly. This simplifies a precision adjustment process.

With reference to the first embodiment, in some implementations of the first embodiment, the determining a motion vector predictor of the current image block based on the location of the target adjacent image block and the target motion vector precision includes: when there is a motion vector at the location of the target adjacent image block, determining a location pointed by the motion vector of the target adjacent image block as a start search point; starting a search from the start search point to obtain at least one motion vector; selecting, as a target motion vector, one motion vector from the at least one motion vector; adjusting precision of the target motion vector based on the target motion vector precision, to obtain an adjusted target motion vector, where precision of the adjusted target motion vector is the target motion vector precision; and determining the adjusted target motion vector as the motion vector predictor of the current image block.

With reference to the first embodiment, in some implementations of the first embodiment, the determining a motion vector predictor of the current image block based on the location of the target adjacent image block and the target motion vector precision includes: when there is a motion vector at the location of the target adjacent image block, determining a location pointed by the motion vector of the target adjacent image block as a start search point; starting a search from the start search point to obtain at least one motion vector; selecting, as a target motion vector, one motion vector from the at least one motion vector; and determining whether precision of the target motion vector is the target motion vector precision; and when the precision of the target motion vector is the target motion vector precision, determining the target motion vector as the motion vector predictor of the current image block; or when the precision of the target motion vector is not the target motion vector precision, adjusting the precision of the target motion vector based on the target motion vector precision, to obtain an adjusted target motion vector, where precision of the adjusted target motion vector is the target motion vector precision; and determining the adjusted target motion vector as the motion vector predictor of the current image block.

In some embodiments of this application, when the target adjacent image block has a motion vector, an optimal motion vector can be found in a motion search manner and is used as the motion vector predictor of the current image block, so as to improve accuracy of inter prediction.

With reference to the first embodiment, in some implementations of the first embodiment, the determining a motion vector predictor of the current image block based on the location of the target adjacent image block and the target motion vector precision includes: determining whether the target motion vector precision is first preset precision; and when the target motion vector precision is not the first preset precision, the determining a motion vector predictor of the current image block based on the location of the target adjacent image block and the target motion vector precision includes: adjusting precision of a motion vector of the target adjacent image block based on the target motion vector precision, to obtain an adjusted motion vector, where precision of the adjusted motion vector is the target motion vector precision; and determining the adjusted motion vector as the motion vector predictor of the current image block; or when the target motion vector precision is the first preset precision, the determining a motion vector predictor of the current image block based on the location of the target adjacent image block and the target motion vector precision includes: determining a location pointed by a motion vector of the target adjacent image block as a start search point; starting a search from the start search point to obtain at least one motion vector; selecting, as a target motion vector, one motion vector from the at least one motion vector; adjusting precision of the target motion vector based on the target motion vector precision, to obtain an adjusted target motion vector, where precision of the adjusted target motion vector is the target motion vector precision; and determining the adjusted target motion vector as the motion vector predictor of the current image block.

In some embodiments, the first preset precision may be one motion vector precision value. For example, the first preset precision is the ¼ pixel.

In some embodiments, the first preset precision may alternatively include a plurality of motion vector precision values. For example, the first preset precision is the ¼ pixel and the ½ pixel.

In some embodiments, the first preset precision may alternatively be a precision range. The first preset precision is precision less than or equal to the ½ pixel.

For example, the first preset precision is the ¼ pixel. In this case, the motion search manner is used to obtain the motion vector predictor of the current image block when the target motion vector precision is also the ¼ pixel. A manner of adjusting motion vector precision is used to obtain the motion vector predictor of the current image block when the target motion vector precision is precision other than the ¼ pixel.

With reference to the first embodiment, in some implementations of the first embodiment, the determining a motion vector predictor of the current image block based on the location of the target adjacent image block and the target motion vector precision includes: when there is no motion vector at the location of the target adjacent image block, obtaining a first adjacent image block from a plurality of adjacent image blocks of the current image block based on a preset sorting sequence of the plurality of adjacent image blocks, where the first adjacent image block is an image block that has a motion vector among the plurality of adjacent image blocks; adjusting precision of the motion vector of the first adjacent image block based on the target motion vector precision, to obtain an adjusted motion vector, where precision of the adjusted motion vector is the target motion vector precision; and determining the adjusted motion vector as the motion vector predictor of the current image block.

In some embodiments, the preset sorting sequence of the plurality of adjacent image blocks is obtained by sorting the plurality of adjacent image blocks in ascending order or in descending order of motion vector precision corresponding to locations of the plurality of adjacent image blocks.

In some embodiments, the obtaining a first adjacent image block from a plurality of adjacent image blocks of the current image block based on a preset sorting sequence of the plurality of adjacent image blocks includes: obtaining, as the first adjacent image block, an image block in a highest or lowest rank from the plurality of adjacent image blocks of the current image block based on the preset sorting sequence of the plurality of adjacent image blocks.

When the preset sorting sequence of the plurality of adjacent image blocks is obtained based on an ascending order of the motion vector precision corresponding to the locations of the plurality of adjacent image blocks, an adjacent image block in the highest rank may be selected as the first adjacent image block, from the plurality of adjacent image blocks. When the preset sorting sequence of the plurality of adjacent image blocks is obtained based on a descending order of the motion vector precision corresponding to the locations of the plurality of adjacent image blocks, an adjacent image block in the lowest rank may be selected as the first adjacent image block, from the plurality of adjacent image blocks.

In some embodiments of this application, when the target adjacent image block has no motion vector, the motion vector of the obtained first adjacent image block is adjusted based on the target motion vector precision, to obtain the motion vector predictor of the current image block. This can quickly determine the motion vector predictor of the current image block when the target adjacent image block has no motion vector, thereby reducing complexity of inter prediction.

In some embodiments, the obtaining the motion vector predictor of the current image block based on a motion vector of the first adjacent image block specifically includes: determining whether the precision of the motion vector of the first adjacent image block is the target motion vector precision; and when the precision of the motion vector of the first adjacent image block is the target motion vector precision, determining the motion vector of the first adjacent image block as the motion vector predictor of the current image block; or when the precision of the motion vector of the first adjacent image block is not the target motion vector precision, adjusting the precision of the motion vector of the first adjacent image block based on the target motion vector precision, to obtain an adjusted motion vector, where precision of the adjusted motion vector is the target motion vector precision; and determining the adjusted motion vector as the motion vector predictor of the current image block.

With reference to the first embodiment, in some implementations of the first embodiment, the determining a motion vector predictor of the current image block based on the location of the target adjacent image block and the target motion vector precision includes: when there is no motion vector at the location of the target adjacent image block, obtaining a plurality of second adjacent image blocks from adjacent image blocks of the current image block, where the second adjacent image block is an image block that has a motion vector among the adjacent image blocks of the current image block; selecting, as a start search point, one location from a plurality of locations pointed by motion vectors of the plurality of second adjacent image blocks; starting a search from the start search point to obtain at least one motion vector; selecting, as a target motion vector, one motion vector from the at least one motion vector; adjusting precision of the target motion vector based on the target motion vector precision, to obtain an adjusted target motion vector, where precision of the adjusted target motion vector is the target motion vector precision; and determining the adjusted target motion vector as the motion vector predictor of the current image block.

With reference to the first embodiment, in some implementations of the first embodiment, the determining a motion vector predictor of the current image block based on the location of the target adjacent image block and the target motion vector precision includes: when there is no motion vector at the location of the target adjacent image block, obtaining a plurality of second adjacent image blocks from adjacent image blocks of the current image block, where the second adjacent image block is an image block that has a motion vector among the adjacent image blocks of the current image block; selecting, as a start search point, one location from a plurality of locations pointed by motion vectors of the plurality of second adjacent image blocks; starting a search from the start search point to obtain at least one motion vector; selecting, as a target motion vector, one motion vector from the at least one motion vector; and determining whether precision of the target motion vector is the target motion vector precision; and when the precision of the target motion vector is the target motion vector precision, determining the target motion vector as the motion vector predictor of the current image block; or when the precision of the target motion vector is not the target motion vector precision, adjusting the precision of the target motion vector based on the target motion vector precision, to obtain an adjusted target motion vector, where precision of the adjusted target motion vector is the target motion vector precision; and determining the adjusted target motion vector as the motion vector predictor of the current image block.

In some embodiments of this application, when the target adjacent image block has no motion vector, the motion vector predictor of the current image block is determined in the motion search manner, so as to improve accuracy of inter prediction.

In some embodiments, the starting a search from the start search point to obtain the motion vector predictor of the current image block specifically includes: starting the search from the start search point based on the target motion vector precision, to obtain the at least one motion vector, where precision of each of the at least one motion vector is the target motion vector precision; selecting, as the target motion vector, one motion vector from the at least one motion vector; and determining the target motion vector as the motion vector predictor of the current image block.

In some embodiments, the starting a search from the start search point to obtain the motion vector predictor of the current image block specifically includes: starting the search from the start search point to obtain the at least one motion vector; selecting, as the target motion vector, one motion vector from the at least one motion vector; adjusting the target motion vector based on the target motion vector precision, so that precision of an adjusted target motion vector is the target motion vector precision; and determining the precision of the adjusted target motion vector as the motion vector predictor of the current image block.

When the motion search manner is used to obtain the motion vector predictor of the current image block, a search may be performed based on the target motion vector precision, so that found motion vector precision is the target motion vector precision; or a search is first performed, and then precision of a selected target motion vector is adjusted.

With reference to the first embodiment, in some implementations of the first embodiment, the determining a motion vector predictor of the current image block based on the location of the target adjacent image block and the target motion vector precision includes: determining whether the target motion vector precision is second preset precision; and when the target motion vector precision is not the second preset precision, the determining a motion vector predictor of the current image block based on the location of the target adjacent image block and the target motion vector precision includes:

obtaining a first adjacent image block from a plurality of adjacent image blocks of the current image block based on a preset sorting sequence of the plurality of adjacent image blocks, where the preset sorting sequence of the plurality of adjacent image blocks is obtained by sorting the plurality of adjacent image blocks in ascending order of motion vector precision corresponding to locations of the plurality of adjacent image blocks, and the first adjacent image block is an image block that has a motion vector among the plurality of adjacent image blocks; adjusting precision of the motion vector of the first adjacent image block based on the target motion vector precision, to obtain an adjusted motion vector, where precision of the adjusted motion vector is the target motion vector precision; and determining the adjusted motion vector as the motion vector predictor of the current image block; or when the target motion vector precision is the second preset precision, the determining a motion vector predictor of the current image block based on the location of the target adjacent image block and the target motion vector precision includes:

obtaining a plurality of second adjacent image blocks from a plurality of adjacent image blocks of the current image block, where the second adjacent image block is an image block that has a motion vector among the plurality of adjacent image blocks; selecting, as a start search point, one location from a plurality of locations pointed by motion vectors of the plurality of second adjacent image blocks; starting a search from the start search point to obtain at least one motion vector; selecting, as a target motion vector, one motion vector from the at least one motion vector; adjusting precision of the target motion vector based on the target motion vector precision, to obtain an adjusted target motion vector, where precision of the adjusted target motion vector is the target motion vector precision; and determining the adjusted target motion vector as the motion vector predictor of the current image block.

With reference to the first embodiment, in some implementations of the first embodiment, the selecting, as a start search point, one location from a plurality of locations pointed by motion vectors of the plurality of second adjacent image blocks includes: selecting, as the start search point, a location corresponding to a smallest sum of absolute differences (SAD) from the plurality of locations in a template matching manner.

It should be understood that, when one location is selected as the start search point, from the plurality of locations, a location corresponding to a smallest sum of absolute transformed differences (SATD) or a smallest mean square error (MSE) may alternatively be selected as the start search point, from the plurality of locations in the template matching manner.

In some embodiments, the second preset precision may be one motion vector precision value. For example, the second preset precision is a ⅛ pixel.

In some embodiments, the second preset precision may alternatively include a plurality of motion vector precision values. For example, the second preset precision is a ⅛ pixel, the ¼ pixel, and the ½ pixel.

In some embodiments, the second preset precision may alternatively be a precision range. The second preset precision is precision less than or equal to the integer pixel.

For example, the second preset precision is less than or equal to the integer pixel. In this case, the motion search manner is used to obtain the motion vector predictor of the current image block provided that the target motion vector precision is less than or equal to the integer pixel. A manner of adjusting motion vector precision is used to obtain the motion vector predictor of the current image block when the target motion vector precision is greater than the integer pixel.

With reference to the first embodiment, in some implementations of the first embodiment, the method further includes: parsing a bitstream to obtain first indication information, where the first indication information is used to indicate the first preset precision; and the determining whether the target motion vector precision is first preset precision includes: determining, based on the first indication information, whether the target motion vector precision is the first preset precision.

With reference to the first embodiment, in some implementations of the first embodiment, the method further includes: parsing a bitstream to obtain second indication information, where the second indication information is used to indicate the second preset precision; and the determining whether the target motion vector precision is second preset precision includes: determining, based on the second indication information, whether the target motion vector precision is the second preset precision.

In some embodiments, the first indication information and the second indication information can flexibly indicate the first preset precision and the second preset precision.

With reference to the first embodiment, in some implementations of the first embodiment, the first indication information or the second indication information is carried in any one of a sequence parameter set, a picture parameter set, or a slice header of the current image block.

With reference to the first embodiment, in some implementations of the first embodiment, the selecting, as a target motion vector, one motion vector from the at least one motion vector includes: selecting, as the target motion vector, a motion vector corresponding to a smallest SAD from the at least one motion vector through template matching.

It should be understood that, when the target motion vector is selected through template matching, a motion vector corresponding to a smallest SATD or a smallest MSE may alternatively be selected as the target motion vector, from the at least one motion vector.

According to a second embodiment, an inter prediction apparatus is provided. The apparatus includes modules configured to perform the method in the first embodiment or the implementations of the first embodiment.

According to a third embodiment, a terminal device is provided. The terminal device includes: a memory, configured to store a program; and a processor, configured to execute the program stored in the memory. When the program is executed, the processor is configured to perform the method in the first embodiment or the implementations of the first embodiment.

According to a fourth embodiment, a decoder is provided, including a non-volatile storage medium and a central processing unit. The non-volatile storage medium stores an executable program, and the central processing unit is connected to the non-volatile storage medium and performs the method in the first embodiment or the implementations of the first embodiment.

According to a fifth embodiment, a video encoding and decoding system is provided, including a non-volatile storage medium and a central processing unit. The non-volatile storage medium stores an executable program, and the central processing unit is connected to the non-volatile storage medium and executes the executable program to perform the method in the first embodiment or the implementations of the first embodiment.

DETAILED DESCRIPTION

Figure 1:
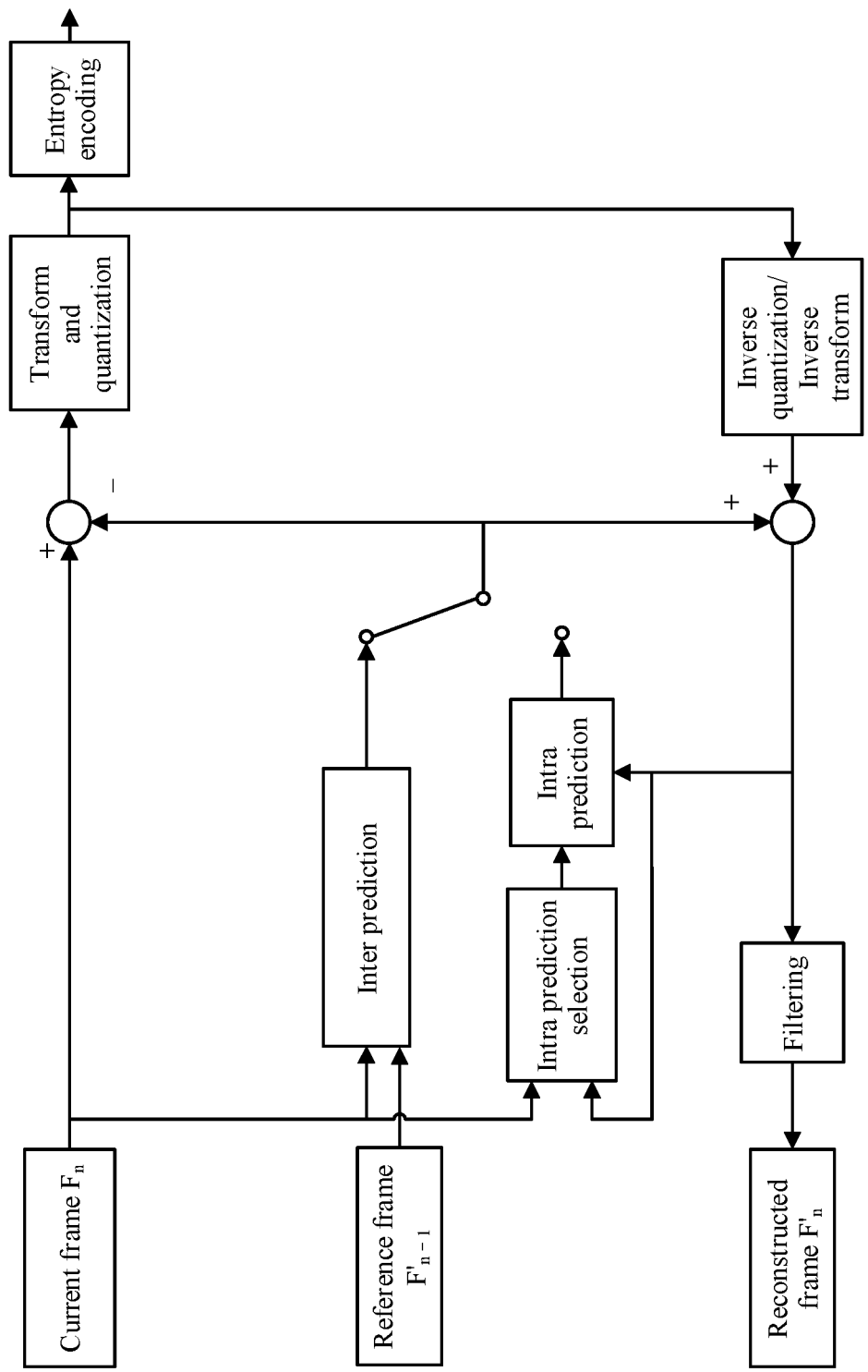
FIG. 1 is a schematic diagram of a video encoding process.

To make a person skilled in the art understand the solutions in the present disclosure better, the following describes several embodiments in more detail with reference to the accompanying drawings and implementations. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure. The following describes technical solutions of this application with reference to the accompanying drawings.

An inter prediction method in this application can be applied to the field of video encoding and decoding technologies. For a better understanding of the inter prediction method in this application, the following first describes video encoding and decoding.

A video is usually formed by many frames of images in a specific sequence. Usually, massive repeated information (redundant information) exists in one frame of image or between different frames of images. For example, one frame of image usually includes a large quantity of parts that have a same spatial structure or similar spatial structures. In other words, a video file includes a large amount of spatially redundant information. In addition, the video file also includes a large amount of temporally redundant information. This is caused by a composition structure of a video. For example, a frame rate of video sampling is usually 25 frames/second to 60 frames/second. To be specific, a sampling time interval between two adjacent frames is within a range from 1/60 second to 1/25 second. In such a short time, a large amount of similar information almost exists in all images obtained through sampling, and the images are closely associated.

In addition, related researches show that a part that can be compressed, that is, visual redundancy, also exists in video information from a perspective of a psychological feature: visual sensitivity of human eyes. The visual redundancy means that a video bitstream is properly compressed by using a feature that human eyes are more sensitive to a luminance change but less sensitive to a chrominance change. For example, in a high-luminance region, sensitivity of human eye vision to a luminance change decreases, and the human eye vision is more sensitive to an object edge instead. In addition, human eyes are less sensitive to an internal region but more sensitive to an overall structure. Because a video image is used to finally provide services for the human group, compression processing may be performed on an original video image by fully using such features of human eyes, to achieve a better compression effect. In addition to the above-mentioned space redundancy, time redundancy, and visual redundancy, a series of redundant information such as information entropy redundancy, structural redundancy, knowledge redundancy, and importance redundancy may exist in video image information. An objective of video encoding (which may also be referred to as video compression coding) is to remove redundant information from a video sequence by using various technical methods, to reduce storage space and save transmission bandwidth.

Currently, in an international universal range, there are four mainstream compression coding manners in video compression coding standards: chrominance sampling, predictive coding, transform coding, and quantization coding. The following separately describes in detail these coding manners.

Chrominance sampling: In this manner, visual and psychological features of human eyes are fully used, to attempt to maximally reduce a data volume described by a single element starting from an underlying data representation. For example, luminance-chrominance-chrominance (YUV) color coding is used in most television systems, and is a standard widely used in television systems in Europe. YUV color space includes a luminance signal Y and two color difference signals U and V. The three components are independent of each other. Compared with a red-green-blue (RGB) color mode, the YUV color space has more advantages: A separation representation manner is more flexible, and lower bandwidth is occupied for transmission. For example, a form of YUV 4:2:0 indicates that the two chrominance components U and V are a half of the luminance component Y in both a horizontal direction and a vertical direction. In other words, four sampling pixels include four luminance components Y, one chrominance component U, and one chrominance component V. When such a representation form is used, the data volume is further reduced and accounts for 33% of an original data volume approximately. Therefore, chrominance sampling fully uses physiological and visual features of human eyes to implement video compression in such a chrominance sampling manner, and is one of video data compression manners widely used at present.

Predictive coding: During predictive coding, a currently-to-be-encoded frame is predicted by using data information of a previously encoded frame. A predictor is obtained through prediction and is not exactly equal to an actual value. A residual value exists between the predictor and the actual value. More accurate prediction indicates a predictor closer to an actual value and a smaller residual value. In this way, a data volume can be greatly reduced by encoding the residual value. A matching image is restored and reconstructed by adding the residual value to the predictor during decoding on a decoder side. This is a basic idea and method of the predictive coding. In mainstream coding standards, predictive coding is classified into two basic types: intra prediction and inter prediction. The intra prediction (intra prediction) means that a pixel value of a pixel in a current coding unit is predicted by using a pixel value of a pixel in a reconstructed area in a current image. The inter prediction (inter prediction) means that in a reconstructed image, a matching reference block for a current coding unit in a current image is searched for, a pixel value of a pixel in the reference block is used as predicted information or a predictor of a pixel value of a pixel in the current coding unit, and motion information of the current coding unit is transmitted.

Transform coding: In this coding manner, original space domain information is not directly encoded. Instead, a sampled value of the information is transformed from a current domain into another artificially defined domain (which is usually referred to as a transform domain) by using a transform function in a specific form, and then compression coding is performed based on a distribution feature of the information in the transform domain. Because a data correlation of video image data is usually high in a space domain and a large amount of redundant information exists, if encoding is directly performed, a large quantity of bits are used. In contrast, after the sampled value of the information is transformed into the transform domain, the data correlation is greatly lowered. In this case, during encoding, because redundant information is reduced, a data volume required for the encoding is greatly reduced accordingly. In this way, a relatively high compression ratio can be obtained, and a relatively favorable compression effect can be achieved. Typical transform coding manners include Karhunen-Loeve (K-L) transform, Fourier transform, and the like.

Quantization coding: Data is actually compressed during the above-mentioned transform coding, but can be effectively compressed in a quantization process. The quantization process is a main reason for a data "loss" in lossy compression. The quantization process is a process in which "forcibly planning" is performed, so that an input value with a relatively large dynamic range is replaced with a relatively small quantity of output values. A quantization input value has a relatively large range, and therefore is represented by using a relatively large quantity of bits. In contrast, an output value obtained after the "forcibly planning" has a relatively small range, and therefore is represented by using a small quantity of bits.

In a coding algorithm based on a hybrid coding architecture, the foregoing several compression coding manners can be used in combination. An encoder control module selects, based on local features of different image blocks in a video frame, encoding modes used for the image blocks. Frequency domain prediction or space domain prediction is performed on a block on which intra predictive coding is performed, and motion compensation prediction is performed on a block on which inter predictive coding is performed. Then, transform and quantization processing are performed on a predicted residual to form a residual coefficient. At last, a final bitstream is generated by using an entropy encoder. To avoid accumulation of prediction errors, an intra-frame prediction reference signal or inter prediction reference signal is obtained by using a decoding module on an encoder side. Inverse quantization and inverse transform are performed on the residual coefficient obtained through the transform and quantization, to reconstruct a residual signal, and then the residual signal is added to a predicted reference signal, to obtain a reconstructed image. In addition, pixel correction is performed on the reconstructed image through loop filtering, to improve encoding quality of the reconstructed image.

Figure 2:
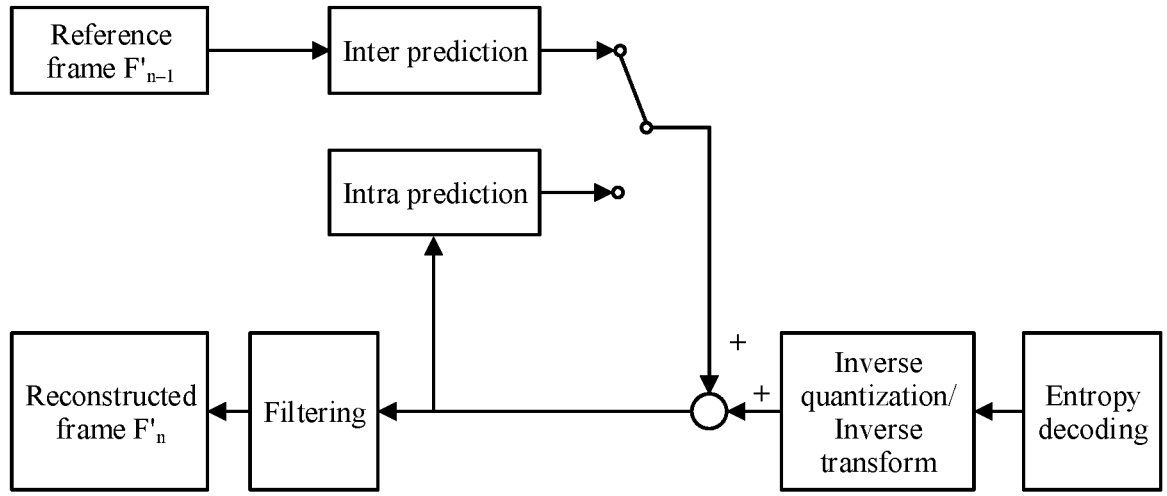
FIG. 2 is a schematic diagram of a video decoding process.

The following briefly describes entire video encoding and decoding processes with reference to FIG. 1 and FIG. 2.

FIG. 1 is a schematic diagram of a video encoding process.

As shown in FIG. 1, a current image block in a current frame $F_n$ may be predicted through intra prediction or inter prediction. Specifically, intra-frame coding or inter coding may be selected based on a type of the current frame $F_n$. For example, when the current frame $F_n$ is an I frame, the intra prediction is used; or when the current frame $F_n$ is a P frame or a B frame, the inter prediction is used. When intra prediction is used, a pixel value of a pixel in the current image block may be predicted by using a pixel value of a pixel in a reconstructed area in the current frame $F_n$. When the inter prediction is used, a pixel value of a pixel in the current image block may be predicted by using a pixel value of a pixel in a reference block that is in a reference frame $F'_{n-1}$ and that matches the current image block.

After a to-be-predicted block of the current image block is obtained through the inter prediction or the intra prediction, a difference between the pixel value of the pixel in the current image block and a pixel value of a pixel in the to-be-predicted block is calculated to obtain residual information, and transform, quantization, and entropy encoding are performed on the residual information to obtain an encoded bitstream. In addition, in the encoding process, superposition is performed on the residual information of the current frame $F_n$ and predicted information of the current frame $F_n$, and a filtering operation is performed, to obtain a reconstructed frame $F'_n$ of the current frame and use the reconstructed frame $F'_n$ as a reference frame for subsequent encoding.

FIG. 2 is a schematic diagram of a video decoding process.

The video decoding process shown in FIG. 2 is a reverse process of the video encoding process shown in FIG. 1. During decoding, residual information is obtained through entropy decoding, inverse quantization, and inverse transform, and whether intra-frame prediction or inter prediction is performed on a current image block is determined based on a decoded bitstream. In case of the intra prediction, predicted information is constructed by using a pixel value of a pixel in a reconstructed region of a current frame and according to an intra prediction method. In case of the inter prediction, motion information is parsed out, a reference block is determined in a reconstructed image by using the motion information that is parsed out, a pixel value of a pixel in the reference block is used as predicted information, superposition is performed on the predicted information and the residual information, and a filtering operation is performed to obtain reconstructed information.

The method in the embodiments of this application may be applied to a video encoding process or a video decoding process. Specifically, the inter prediction method in the embodiments of this application may be applied to an inter prediction process shown in FIG. 2.

For a better understanding of the inter prediction method in the embodiments of this application, the following first describes a basic concept of inter prediction/inter coding briefly.

Inter prediction/inter coding (motion prediction/compensation) is an important video compression technology, and is used to remove time domain redundancy in video information. Because a video sequence usually has a quite high time domain correlation, not all information about each image is required, and motion information and motion compensation information in a current frame (current frame) is transmitted to a decoder side. Inter prediction means that an encoded image is used as a reference frame (reference frame) of a current frame, a matching reference block for a current coding block in the current image is searched for, a pixel value of a pixel in the reference block is used as predicted information or a predictor of a pixel value of a pixel in the current coding block, and motion information of each block is obtained. The motion information usually includes indication information of an image in which the reference block in located, that is, reference frame information, and information about a shift from the reference block to a current coding block, that is, a motion vector (motion vector, MV).

In addition, in the video encoding and decoding processes, a relatively large proportion of a compressed bitstream is used for transmitting motion information. In case of a low bit rate, especially for a high-definition video, a quantity of bits used to indicate motion information usually exceeds 50% of a total bitstream. Efficient coding on motion information is an important means to improve coding efficiency. In a video, blocks at adjacent locations may belong to a same object or in a same motion scenario and have similar motion. Therefore, a quantity of bits occupied for motion information can be reduced by using a motion vector correlation of adjacent image blocks in space domain and time domain.

In encoding and decoding standards, motion information of adjacent locations is usually used to predict motion information of a current location. Differential coding is performed on an MV in motion information. The MV is divided into two parts: an MV predictor and a motion vector difference (motion vector difference, MVD). The MV predictor is not encoded or is not directly encoded, and is derived by using motion vectors of adjacent image blocks in time domain and space domain. MVD information is encoded and then transmitted in a bitstream. In the decoding process, the MVD is extracted from the bitstream to derive the MV predictor, and the MV predictor is added to the MVD to obtain the final MV. When the derived MV predictor approximates to the final MV to a greater extent, the MVD that is transmitted is smaller. Therefore, optimization of an MV predictor derivation method can effectively reduce a quantity of bits occupied for motion information, and is crucial for efficient coding.

In addition, in this application, variable motion vector precision may alternatively be used during inter prediction. The following briefly describes meanings of the variable motion vector precision.

In an actual scenario, an object motion distance is unnecessarily an integer multiple of a pixel size. If motion prediction/compensation with integer pixel precision is used, an inaccurate matching case occurs, resulting in a relatively large motion compensation residual. In view of this, to improve motion prediction/compensation precision, motion prediction/compensation with sub-pixel precision is used. Because there is no pixel at a sub-pixel location, the motion prediction/compensation with sub-pixel precision is implemented through interpolation performed on a reference image. The video and audio lossy compression standard MPEG1 uses motion prediction/compensation with half (½) pixel precision, and a reference pixel at a half pixel location for the motion prediction/compensation with half (½) pixel precision is generated by using a bilinear interpolation method. The video codec standard H.264 uses motion prediction/compensation with ¼ pixel precision. With improvement of interpolation precision, efficiency of motion prediction/compensation is improved to some extent. However, as precision of an MV that is transmitted improves, a quantity of used bits increases accordingly. For example, compared with ¼ pixel precision, coding efficiency with ⅛ pixel precision is not improved obviously within a medium and low bit rate range. Because of diversity of motion and a texture, motion prediction precision improvement has different impact on different blocks. For example, for an area with a relatively even texture, a coding effect brought by motion prediction precision improvement is limited; for an area with a relatively complex texture, improvement of a coding effect brought by motion prediction precision improvement is relatively obvious.

Figure 3:
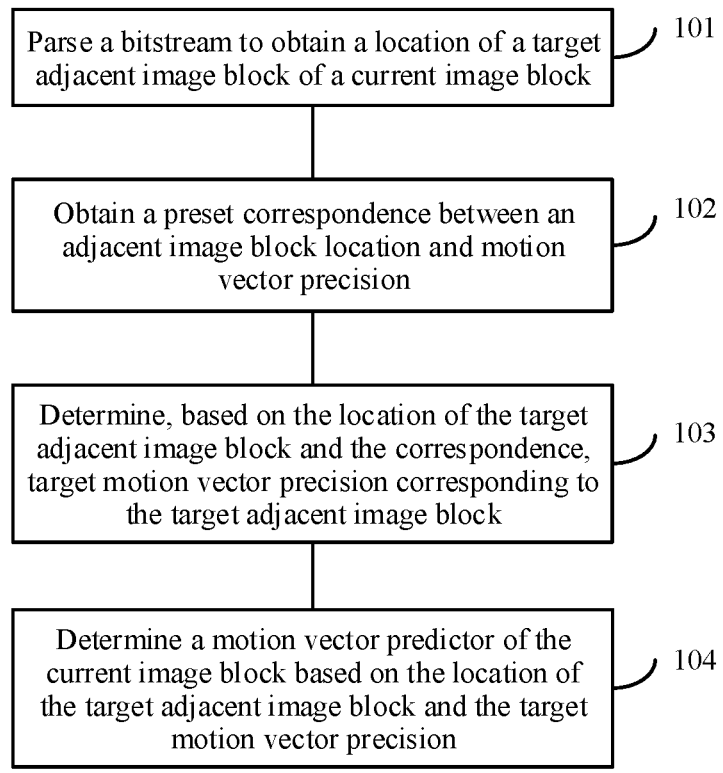
FIG. 3 is a schematic flowchart of an inter prediction method according to some embodiments of this application.

FIG. 3 is a schematic flowchart of an inter prediction method according to an embodiment of this application. The method shown in FIG. 3 is performed on a decoder side. The method shown in FIG. 3 may be performed by a video decoding apparatus, a video decoder, a video encoding and decoding system, or another device having a video decoding function.

The method shown in FIG. 3 includes step 101 to step 104. The following separately describes step 101 to step 104 in detail.

101. Parse a bitstream to obtain a location of a target adjacent image block of a current image block.

The location of the target adjacent image block may be determined when an encoder side encodes an image. A specific process of determining the target adjacent image block by the encoder side includes:

first, the encoder side obtains a plurality of motion vector predictors of the current image block based on motion vectors of a plurality of adjacent image blocks of the current image block;

next, the encoder side determines an optimal motion vector predictor from the plurality of motion vector predictors; and finally, the encoder side determines, as the target adjacent image block, an adjacent image block corresponding to the optimal motion vector predictor.

After determining the target adjacent image block, the encoder side may write the location of the target adjacent image block into a bitstream, and then transmit the bitstream to the decoder side.

In some embodiments, the target adjacent image block may be an image block adjacent to the current image block in time domain or may be an image block adjacent to the current image block in space domain.

In some embodiments, in an embodiment, the parsing a bitstream to obtain a location of a target adjacent image block of a current image block specifically includes: parsing the bitstream to obtain a target index value. The target index value is used to indicate the location of the target adjacent image block.

It should be understood that a location of each adjacent image block may be corresponding to one index value. In this case, writing, by the encoder side, the location of the adjacent image block into a bitstream may specifically be: writing an index value corresponding to the location of the adjacent image block into the bitstream. In this way, the decoder side can parse an index value in the bitstream to obtain a location of a corresponding adjacent image block.

For a better understanding of the target index value, a process of determining the target index value from a perspective of the encoder side is first described herein.

The process of determining the target index value by the encoder side specifically includes the following steps.

(1) Determine, in ascending order of index values in Table 1, whether an adjacent image block, of the current image block, at each location has a motion vector.

TABLE 1

| Index value | Location of an adjacent image block relative to a to-be-predicted image block | Specified motion vector precision |
| --- | --- | --- |
| 0 | Left | ¼ |
| 1 | Upper | ½ |
| 2 | Upper right | 1 |
| 3 | Upper left | 2 |
| 4 | Same location as the to-be-predicted image block in time domain | 4 |
| 5 | Lower left | 8 |

Table 1 lists motion vector precision corresponding to locations of different adjacent image blocks. Specified motion vector precision is expressed as a pixel. For example, specified motion vector precision being ½ specifically means that the specified motion vector precision is a ½ pixel.

Figure 4:
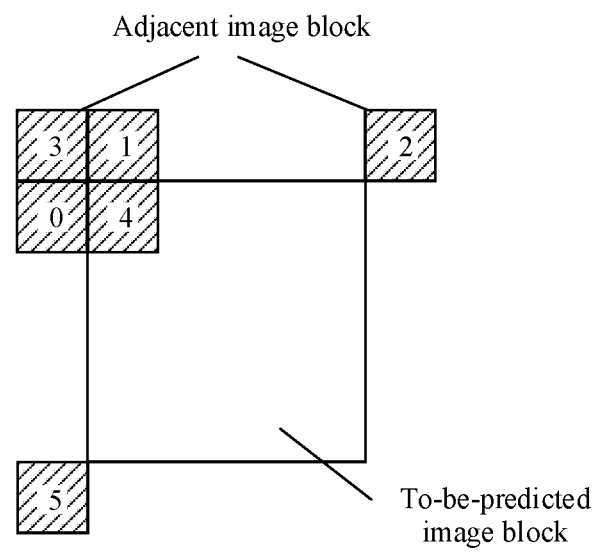
FIG. 4 is a schematic distribution diagram of adjacent image blocks corresponding to a to-be-predicted image block.

For example, FIG. 4 shows specific distribution locations of adjacent image blocks of the to-be-predicted image block in Table 1. Adjacent image blocks corresponding to index values 0, 1, 2, 3, and 5 are adjacent image blocks that are adjacent to the to-be-predicted image block in space domain, and an adjacent image block corresponding to the index value 4 is an adjacent image block that is at a same location as the to-be-predicted image block in time domain. Specifically, the adjacent image block corresponding to the index value 4 may be a decoded image block that is adjacent to the to-be-predicted image block in time domain.

(2) If an adjacent image block has a motion vector, adjust precision of a motion vector of the adjacent image block to motion vector precision corresponding to the adjacent image block, and use an adjusted motion vector as a motion vector predictor of the current image block.

(3) If an adjacent image block has no motion vector, continue searching for an adjacent image block that has a motion vector (a usable adjacent image block), adjust motion vector precision of the usable adjacent image block to target motion vector precision, and use an adjusted motion vector as a motion vector predictor of the current image block.

It should be understood that a plurality of motion vector predictors of the current image block can be obtained based on the adjacent image blocks by using the foregoing procedures (2) and (3).

(4) Obtain an optimal motion vector predictor from the plurality of motion vector predictors based on rate distortion.

(5) Determine an index value of an adjacent image block corresponding to the optimal motion vector predictor, and determine the index value as the target index value.

(6) Write the target index value into an encoded bitstream.

For example, the optimal motion vector predictor is obtained based on a motion vector of an adjacent image block with an index value 3, and in this case, the index value 3 is the target index value. The encoder side writes the index value 3 into the encoded bitstream, so that the decoder side can obtain the adjacent image block corresponding to the index value 3 after parsing the encoded bitstream, and obtain a target motion vector predictor based on the motion vector of the adjacent image block corresponding to the index value 3.

The encoded bitstream including information about the target index value can be obtained by using the foregoing process shown in (1) to (6). It should be understood that the foregoing process shown in (1) to (6) is merely a specific example of determining the target index value. The encoder side may alternatively use any other manner to determine the target motion vector predictor, and determine, as the target index value, an index value corresponding to an adjacent image block corresponding to the target motion vector predictor. This is not limited in this application.

102. Obtain a preset correspondence between an adjacent image block location and motion vector precision.

In the correspondence, locations of at least two adjacent image blocks are corresponding to different motion vector precision. In addition, the correspondence is used to indicate required precision of the motion vector predictor of the current image block when motion vector prediction is performed on the current image block by using adjacent image blocks at different locations.

It should be understood that the adjacent image block location may be a location of an adjacent image block relative to the to-be-predicted image block. As shown in FIG. 4, adjacent image blocks are located on the left of the to-be-predicted image block and above the to-be-predicted image block. Each location may be corresponding to one motion vector precision value. Motion vector precision corresponding to the location of each adjacent image block in FIG. 4 may be listed in Table 1. Specifically, for example, if an adjacent image block is at a location corresponding to the index value 3 in FIG. 4, it can be learnt from Table 1 that motion vector precision corresponding to the location may be motion vector precision corresponding to the index value 3, that is, integer pixel precision.

It should be understood that the correspondence between an adjacent image block location and motion vector precision is not limited to a text form, and a form shown in the accompanying drawings or the tables in this specification. Any form that can represent the correspondence between an adjacent image block location and motion vector precision falls within the protection scope of this application.

In some embodiments, the correspondence between an adjacent image block location and motion vector precision may be listed in Table 2. For example, in Table 2, when an adjacent image block on the left of the current image block is used to perform motion vector prediction on the current image block, required precision of the motion vector predictor of the current image block is a ¼ pixel.

TABLE 2

| Location of an adjacent image block relative to the current image block | Motion vector precision |
|---|---|
| Left | ¼ |
| Upper | ½ |
| Upper right | 1 |
| Upper left | 2 |
| Same location as the current image block in time domain | 4 |
| Lower left | 8 |

In some embodiments, the preset correspondence between an adjacent image block location and motion vector precision may be written into the encoder side and the decoder side in advance.

In this way, after parsing the bitstream to obtain a location of an adjacent image block, the decoder side can determine, based on the correspondence between an adjacent image block location and motion vector precision, motion vector precision corresponding to the adjacent image block.

In some embodiments, in Table 2, a location of each adjacent image block may further be corresponding to one index value. In this case, a correspondence among an index value, a location of an adjacent image block, and motion vector precision may be listed in Table 3. Table 3 lists the index value corresponding to the location of each adjacent image block. In this way, during encoding, a target index value corresponding to a target adjacent image block may be written into the bitstream directly. When performing decoding, the decoder side may determine a location of the target adjacent image block by using the target index value obtained through decoding, and then determine, based on the correspondence between an adjacent image block location and motion vector precision, motion vector precision corresponding to the location of the target adjacent image block. Alternatively, the decoder side may directly determine, by using the target index value, a location of the target adjacent image block and motion vector precision corresponding to the location of the target adjacent image block.

TABLE 3

| Index value | Location of an adjacent image block relative to the current image block | Motion vector precision |
|---|---|---|
| 0 | Left | ¼ |
| 1 | Upper | ½ |
| 2 | Upper right | 1 |
| 3 | Upper left | 2 |
| 4 | Same location as the current image block in time domain | 4 |
| 5 | Lower left | 8 |

In some embodiments, when a sorting sequence of adjacent image blocks listed in Table 3 is being determined (corresponding index values are being determined), based on historical statistical data for inter prediction, motion vector precision that appears at a higher frequency is in a higher rank (a corresponding index value is smaller), and motion vector precision that appears at a lower frequency is in a lower rank (a corresponding index value is larger). In this way, when encoding the index values, the encoder side encodes a smaller index value with a larger quantity of times, and encodes a larger index value with a smaller quantity of times. If the encoder side uses variable length coding, a bitstream is reduced to some extent in the entire encoding process.

It should be understood that Table 2 and Table 3 merely show specific representation forms of the correspondence between an adjacent image block location and motion vector precision, and the forms shown in Table 2 and Table 3 do not constitute any limitation on the correspondence between an adjacent image block location and motion vector precision. Any form that can represent the correspondence between an adjacent image block location and motion vector precision falls within the protection scope of this application.

In some embodiments, in an embodiment, in the correspondence, a location of an $i^{th}$ adjacent image block is corresponding to $j^{th}$ motion vector precision, the $j^{th}$ motion vector precision is motion vector precision that is most frequently used (or may be with a largest use proportion) when image motion vector prediction is performed at the location of the $i^{th}$ adjacent image block within a preset statistical period, and the $i^{th}$ adjacent image block is any one of a plurality of adjacent image blocks corresponding to a to-be-predicted image block.

It should be understood that during motion vector prediction, the motion vector prediction may be performed on the to-be-predicted image block by using a plurality of adjacent image blocks of the to-be-predicted image block. The $i^{th}$ adjacent image block is any one of the plurality of adjacent image blocks.

In this application, the motion vector precision that is most frequently used when image motion vector prediction is performed within the preset statistical time is used as motion vector precision corresponding to an adjacent image block location. In this way, motion vector precision corresponding to each adjacent image block location can be determined relatively properly.

The to-be-predicted image block may be any image block on which motion vector prediction is performed during the motion vector prediction. Further, the current image block in step 101 may be the to-be-predicted image block on which motion vector prediction is performed currently.

The plurality of adjacent image blocks corresponding to the to-be-predicted image block may be some image blocks adjacent to the to-be-predicted image block, or the plurality of adjacent image blocks corresponding to the to-be-predicted image block may be some image blocks that are used when motion vector prediction is performed on the to-be-predicted image block.

In addition, the $i^{th}$ adjacent image block may be any one of the adjacent image blocks with index values 0 to 5 in FIG. 4.

Further, the $i^{th}$ adjacent image block may alternatively be any one of the adjacent image blocks with index values 0 to 5 in Table 3. When the $i^{th}$ adjacent image block is an adjacent image block with an index value 0 in Table 3, the $j^{th}$ motion vector precision corresponding to the $i^{th}$ adjacent image block is the ¼ pixel.

In some embodiments, the preset statistical period (or the preset statistical time) may be a time required for completion of motion vector prediction on a specific quantity of video images (for example, 100 thousand frames of video images).

In some embodiments, the preset statistical period may alternatively be a fixed time period, for example, one month or three months.

In some embodiments, the preset statistical period may alternatively be a time required for reaching a preset quantity of statistical times (for example, 100 thousand times).

It should be understood that the preset statistical period may be a time period for performing motion vector prediction on the to-be-predicted image block before motion vector prediction is performed on the current image block.

It should be understood that, when motion vector prediction is performed on the to-be-predicted image block by using adjacent image blocks at different locations, different motion vector precision may be used. For example, when an adjacent image block on the left of the to-be-predicted image block is used to perform motion vector prediction, a ⅛ pixel, a ¼ pixel, an integer pixel, 2 pixels, 4 pixels, 8 pixels, or the like may be used.

Based on motion vector precision used for each adjacent image block when motion vector prediction is performed on the to-be-predicted image block, it can be found that, when any adjacent image block is used to perform motion vector prediction on the to-be-predicted image block, quantities of times (or frequencies) of using different pixel precision to perform motion vector prediction are different.

For example, a total of 100 times of motion vector prediction are performed on the to-be-predicted image block by using the adjacent image block on the left. The ¼ pixel is used 40 times, the ½ pixel is used 30 times, the integer pixel is used 5 times, the 2 pixels are used 15 times, the 4 pixels are used 5 times, and the 8 pixels are used 5 times. In this case, when the adjacent image block on the left is used to perform motion vector prediction on the to-be-predicted image block, a use frequency (40%) of the ¼ pixel is highest, it indicates that the ¼ pixel is frequently used when the adjacent image block on the left is used to perform motion vector prediction on the to-be-predicted image block, and an effect of performing motion vector prediction with such precision may be better. Therefore, based on the historical statistical data, motion vector precision that is most frequently used when each adjacent image block is used to perform motion vector prediction may be determined as motion vector precision corresponding to a location of the adjacent image block.

Figure 5:
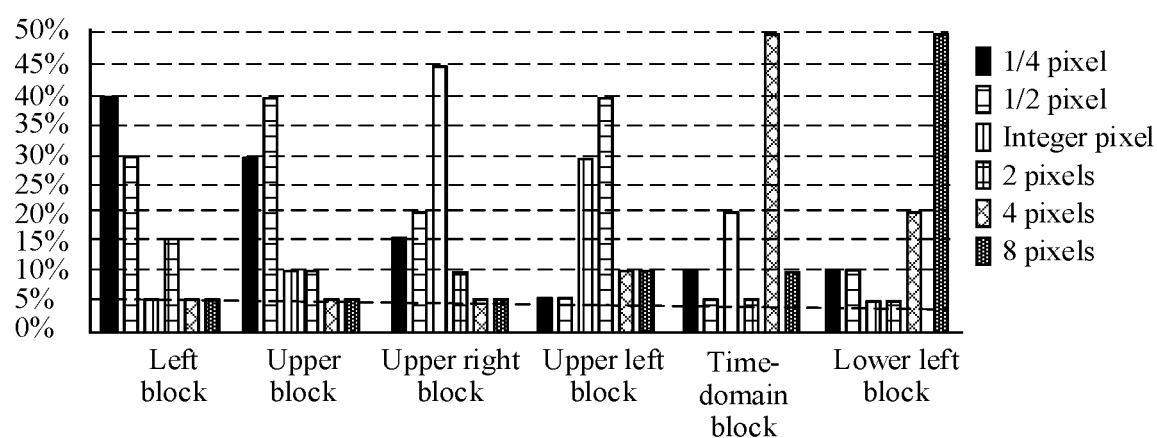
FIG. 5 is a schematic diagram of frequencies of using a variety of motion vector precision for adjacent image blocks at different locations.

Based on the historical statistical data for motion vector prediction performed on the to-be-predicted image block, frequencies (or may be referred to as proportions) of using a variety of motion vector precision when adjacent image blocks at different locations are used to perform motion vector prediction on the to-be-predicted image block can be obtained. As shown in FIG. 5, motion vector precision that is most frequently used when adjacent image blocks at different locations are used to perform motion vector prediction on the to-be-predicted image block is as follows:

motion vector precision that is most frequently used (with a frequency of 40%) for a left adjacent image block (referred to as a left block for short) is the ¼ pixel;

motion vector precision that is most frequently used (with a frequency of 40%) for an upper adjacent image block (referred to as an upper block for short) is the ½ pixel;

motion vector precision that is most frequently used (with a frequency of 45%) for an upper right adjacent image block (referred to as an upper right block for short) is the integer pixel;

motion vector precision that is most frequently used (with a frequency of 40%) for an upper left adjacent image block (referred to as an upper left block for short) is the 2 pixels;

motion vector precision that is most frequently used (with a frequency of 50%) for a time-domain adjacent image block (referred to as a time-domain block for short) is the 4 pixels; and motion vector precision that is most frequently used (with a frequency of 40%) for a lower left adjacent image block (referred to as a lower left block for short) is the 8 pixels.

For each adjacent image block, motion vector precision that is most frequently used when image motion vector prediction is performed within the preset statistical period may be determined as motion vector precision corresponding to the adjacent image block (or a location of the adjacent image block). For example, motion vector precision that is most frequently used when the upper right block is used to perform motion vector prediction is the integer pixel (a use frequency of integer pixel precision is 45% and is greater than a use frequency of other pixel precision). In this case, the integer pixel can be determined as motion vector precision corresponding to the upper right block. Based on the proportions of using a variety of motion vector precision when the adjacent image blocks are used to perform motion vector prediction in FIG. 5, motion vector precision corresponding to the adjacent image blocks may be obtained. Details are listed in Table 4.

TABLE 4

| Adjacent image block of the current image block | Motion vector precision |
| --- | --- |
| Left adjacent image block | ¼ |
| Upper adjacent image block | ½ |
| Upper right adjacent image block | 1 |
| Upper left adjacent image block | 2 |
| Time-domain adjacent image block | 4 |
| Lower left adjacent image block | 8 |

It should be understood that FIG. 5 merely shows a specific implementation form of frequencies of using different motion vector precision when adjacent image blocks at different locations are used to perform motion vector prediction on the to-be-predicted image block. This embodiment of this application is not limited thereto. The frequencies of using different motion vector precision when adjacent image blocks at different locations are used to perform motion vector prediction on the to-be-predicted image block may alternatively be other values.

103. Determine, based on the location of the target adjacent image block and the correspondence, the target motion vector precision corresponding to the target adjacent image block.

For example, as listed in Table 3, when the target adjacent image block is an adjacent image block located above the current image block, specified motion vector precision corresponding to the target adjacent image block is the ½ pixel.

104. Determine the motion vector predictor of the current image block based on the location of the target adjacent image block and the target motion vector precision.

In this application, after the location of the target adjacent image block is obtained, the target motion vector precision corresponding to the target adjacent image block may be determined directly based on the correspondence between an adjacent image block location and motion vector precision, and then motion vector prediction can be performed based on the location of the target adjacent image block and the target motion vector precision. This can reduce complexity of inter prediction.

In some embodiments, a plurality of manners may be used to determine the motion vector predictor of the current image block based on the location of the target adjacent image block and the target motion vector precision. Specifically, during determining of the motion vector predictor of the current image block, the determining the motion vector predictor of the current image block based on whether the target adjacent image block has a motion vector can be classified into two cases.

The following separately details the two cases: the target adjacent image block has a motion vector, and the target adjacent image block has no motion vector.

First case: The target adjacent image block has a motion vector.

When the target adjacent image block has a motion vector, the following two manners may specifically be used to determine the motion vector predictor of the current image block.

First manner: Motion vector precision is adjusted to obtain the motion vector predictor of the current image block.

Specifically, a process of adjusting the motion vector precision to obtain the motion vector predictor of the current image block includes:

(1) adjusting precision of the motion vector of the target adjacent image block based on the target motion vector precision, to obtain an adjusted motion vector, where precision of the adjusted motion vector is the target motion vector precision; and (2) determining the adjusted motion vector as the motion vector predictor of the current image block.

For example, if the target adjacent image block has a corresponding motion vector and motion vector precision corresponding to the target adjacent image block is the ½ pixel, the precision of the motion vector of the target adjacent image block is directly adjusted to ½ pixel precision, and a scaled motion vector is used as the motion vector predictor of the current image block.

In addition, in the first manner, alternatively, before the motion vector of the target adjacent image block is adjusted, whether precision of the motion vector of the target adjacent image block is the target motion vector precision may be first determined. If the precision of the motion vector of the target adjacent image block is the target motion vector precision, the motion vector predictor of the current image block can be obtained without precision adjustment. If the precision of the motion vector of the target adjacent image block is not the target motion vector precision, the precision of the motion vector of the target adjacent image block is adjusted to obtain the motion vector predictor of the current image block. A specific process is as follows:

(3) when the precision of the motion vector of the target adjacent image block is the target motion vector precision, determining the motion vector of the target adjacent image block as the motion vector predictor of the current image block; or (4) when the precision of the motion vector of the target adjacent image block is not the target motion vector precision, adjusting the precision of the motion vector of the target adjacent image block based on the target motion vector precision, to obtain an adjusted motion vector, where precision of the adjusted motion vector is the target motion vector precision; and determining the adjusted motion vector as the motion vector predictor of the current image block.

When the motion vector predictor of the current image block is being determined based on the motion vector of the target adjacent image block, whether the precision of the target adjacent image block is the target motion vector precision is determined in advance, so that when the precision of the target adjacent image block is the target motion vector precision, the motion vector of the target adjacent image block can be determined as the motion vector predictor of the current image block directly. This simplifies a precision adjustment process.

In this application, by using the first manner, the motion vector predictor of the current image block can be quickly determined, thereby reducing complexity of inter prediction.

Second manner: A motion search manner is used to obtain the motion vector predictor of the current image block.

A specific process of using the motion search manner to obtain the motion vector predictor of the current image block includes:

(1) determining a location pointed by the motion vector of the target adjacent image block as a start search point;

(2) starting a search from the start search point to obtain at least one motion vector;

(3) selecting, as a target motion vector, one motion vector from the at least one motion vector;

(4) adjusting precision of the target motion vector based on the target motion vector precision, to obtain an adjusted target motion vector, where precision of the adjusted target motion vector is the target motion vector precision; and (5) determining the adjusted target motion vector as the motion vector predictor of the current image block.

It should be understood that the target motion vector is not the same as the motion vector of the target adjacent image block. The target motion vector may be considered as an optimal motion vector selected from the at least one motion vector, while the motion vector of the target adjacent image block is the motion vector of the target adjacent image block itself (on the premise that the target adjacent image block has a motion vector).

In the second manner, after the target motion vector is obtained, whether the precision of the target motion vector is the target motion vector precision may be first determined. If the precision of the target motion vector is the target motion vector precision, the target motion vector can be determined as the motion vector predictor of the current image block directly. If the precision of the target motion vector is not the target motion vector precision, the precision of the target motion vector is adjusted to the target motion vector precision, and the adjusted target motion vector is determined as the motion vector predictor of the current image block.

In this application, by using the second manner, the motion vector predictor of the current image block can be determined more accurately, thereby improving accuracy of inter prediction.

In some embodiments, before the first manner and the second manner are used to perform motion vector prediction, the method shown in FIG. 3 further includes: determining whether the target motion vector precision is first preset precision; and when the target motion vector precision is not the first preset precision, using the first manner to obtain the motion vector predictor of the current image block; or when the target motion vector precision is the first preset precision, using the second manner to obtain the motion vector predictor of the current image block.

The first preset precision may be one motion vector precision value. For example, the first preset precision is the ¼ pixel.

The first preset precision may alternatively include a plurality of motion vector precision values. For example, the first preset precision is the ¼ pixel and the ½ pixel.

The first preset precision may alternatively be a precision range. The first preset precision is precision less than or equal to the ½ pixel.

For example, the first preset precision is the ¼ pixel. In this case, the motion search manner is used to obtain the motion vector predictor of the current image block when the target motion vector precision is also the ¼ pixel. A manner of adjusting motion vector precision is used to obtain the motion vector predictor of the current image block when the target motion vector precision is precision other than the ¼ pixel.

Second case: The target adjacent image block has no motion vector.

When the target adjacent image block has no motion vector, another adjacent image block that has a motion vector may be obtained from a plurality of adjacent image blocks, and then the motion vector predictor of the current image block is determined based on the another adjacent image block.

Specifically, when the motion vector predictor of the current image block is being determined based on the another adjacent image block, a manner of adjusting precision of a motion vector of the another adjacent image block may be used to obtain the motion vector predictor of the current image block, or the motion search manner may be used to obtain the motion vector predictor of the current image block.

The following details the two manners.

Third manner: The precision of the motion vector of the another adjacent image block is adjusted to obtain the motion vector predictor of the current image block.

Specifically, when the target adjacent image block has no motion vector, the adjusting the precision of the motion vector of the another adjacent image block to obtain the motion vector predictor of the current image block includes the following steps.

(1) Obtain a first adjacent image block from a plurality of adjacent image blocks of the current image block based on a preset sorting sequence of the plurality of adjacent image blocks.

The first adjacent image block is an image block that has a motion vector among the plurality of adjacent image blocks. The preset sorting sequence of the plurality of adjacent image blocks is obtained by sorting the plurality of adjacent image blocks in ascending order or in descending order of motion vector precision corresponding to locations of the plurality of adjacent image blocks.

(2) Adjust precision of the motion vector of the first adjacent image block based on the target motion vector precision, to obtain an adjusted motion vector, where precision of the adjusted motion vector is the target motion vector precision.

(3) Determine the adjusted motion vector as the motion vector predictor of the current image block.

In some embodiments, before the precision of the motion vector of the first adjacent image block is adjusted, whether the precision of the motion vector of the first adjacent image block is the target motion vector precision may be first determined. If the precision of the motion vector of the first adjacent image block is the target motion vector precision, the motion vector of the first adjacent image block can be determined as the motion vector predictor of the current image block directly. If the precision of the motion vector of the first adjacent image block is not the target motion vector precision, the precision of the motion vector of the first adjacent image block is adjusted to the target motion vector precision, and the adjusted motion vector of the first adjacent image block is determined as the motion vector predictor of the current image block.

In the third manner, when the target adjacent image block has no motion vector, the motion vector of the obtained first adjacent image block is adjusted based on the target motion vector precision, to obtain the motion vector predictor of the current image block. This can quickly determine the motion vector predictor of the current image block when the target adjacent image block has no motion vector, thereby reducing complexity of inter prediction.

For example, as listed in Table 5, the current image block includes six adjacent image blocks, and the six adjacent image blocks are sorted based on an ascending order of corresponding motion vector precision. Assuming that the target adjacent image block is an upper right adjacent image block and the upper right adjacent image block has no motion vector, a left adjacent image block with an index value 0 is selected as the first adjacent image block in ascending order of index values in Table 5.

TABLE 5

| Index value | Adjacent image block of the current image block | Motion vector precision |
|---|---|---|
| 0 | Left adjacent image block | ¼ |
| 1 | Upper adjacent image block | ½ |
| 2 | Upper right adjacent image block | 1 |
| 3 | Upper left adjacent image block | 2 |
| 4 | Time-domain adjacent image block | 4 |
| 5 | Lower left adjacent image block | 8 |

For example, as listed in Table 5, an index value corresponding to the target adjacent image block is 3, specified motion vector precision corresponding to the target adjacent image block is the 2 pixel. It is assumed that the target adjacent image block has no motion vector. In this case, an adjacent image block with an index value 0 in Table 5 is selected as the first adjacent image block of the current image block, and then the motion vector of the first adjacent image block is directly scaled to reach 2 pixel precision, so as to obtain the motion vector predictor of the current image block.

In some embodiments, the motion vector of the first adjacent image block may be scaled to reach specified motion vector precision by using Formula (1), so as to obtain the motion vector of the target adjacent image block and further obtain the motion vector predictor of the current image block:

$$MV\_not\_avail=((MV\_available>>idx)<<idx) \quad (1)$$

In Formula (1), MV_available is the motion vector of the first adjacent image block, MV_not_avail is the motion vector of the target adjacent image block, and idx is both an index value of the target adjacent image block and a quantity of shifted bits. A scaled motion vector may also be referred to as the motion vector of the target adjacent image block. Then, the motion vector of the target adjacent image block can be determined as the motion vector predictor of the current image block.

Fourth manner: A motion search manner is used to obtain the motion vector predictor of the current image block.

Specifically, when the target adjacent image block has no motion vector, a specific process of using the motion search manner to determine the motion vector predictor of the current image block includes:

(1) obtaining a plurality of second adjacent image blocks from a plurality of adjacent image blocks of the current image block, where the second adjacent image block is an image block that has a motion vector among the adjacent image blocks of the current image block;

(2) selecting, as a start search point, one location from a plurality of locations pointed by motion vectors of the plurality of second adjacent image blocks;

(3) starting a search from the start search point to obtain at least one motion vector;

(4) selecting, as a target motion vector, one motion vector from the at least one motion vector;

(5) adjusting precision of the target motion vector based on the target motion vector precision, to obtain an adjusted target motion vector, where precision of the adjusted target motion vector is the target motion vector precision; and (6) determining the adjusted target motion vector as the motion vector predictor of the current image block.

In the foregoing procedure shown in (2), a location corresponding to a smallest SAD, SATD, or MSE is selected as the start search point, from a plurality of locations in a template matching manner.

In the fourth manner, after the target motion vector is obtained, whether the precision of the target motion vector is the target motion vector precision may be first determined. If the precision of the target motion vector is the target motion vector precision, the target motion vector can be determined as the motion vector predictor of the current image block directly. If the precision of the target motion vector is not the target motion vector precision, the precision of the target motion vector is adjusted to the target motion vector precision, and the adjusted target motion vector is determined as the motion vector predictor of the current image block.

In this application, when the target adjacent image block has no motion vector, the motion vector predictor of the current image block is determined in the motion search manner, so as to improve accuracy of inter prediction.

For example, as listed in Table 6, the target adjacent image block is an image block with an index value 2 in Table 6. It is assumed that the image block has no motion vector and all other image blocks in Table 6 have motion vectors. In this case, image blocks with index values 0, 1, and 3 may be selected as second adjacent image blocks, from the other image blocks in Table 6. Then, a plurality of locations pointed by motion vectors of the second adjacent image blocks are determined. Next, one location is selected as the start search point, from the plurality of locations. Finally, a search is started from the start search point, a found optimal motion vector is used as the motion vector predictor of the current image block.

TABLE 6

| Index value | Adjacent image block of the current image block | Motion vector precision |
|---|---|---|
| 0 | Left adjacent image block | ¼ |
| 1 | Upper adjacent image block | ½ |
| 2 | Upper right adjacent image block | 1 |
| 3 | Upper left adjacent image block | 2 |
| 4 | Lower left adjacent image block | 8 |

In some embodiments, before the third manner and the fourth manner are used to perform motion vector prediction, the method shown in FIG. 3 further includes: determining whether the target motion vector precision is second preset precision; and when the target motion vector precision is not the second preset precision, using the third manner to obtain the motion vector predictor of the current image block; or when the target motion vector precision is the second preset precision, using the fourth manner to obtain the motion vector predictor of the current image block.

The second preset precision may be one motion vector precision value. For example, the second preset precision is a ⅛ pixel.

The second preset precision may alternatively include a plurality of motion vector precision values. For example, the second preset precision is a ⅛ pixel, the ¼ pixel, and the ½ pixel.

The second preset precision may alternatively be a precision range. The second preset precision is precision less than or equal to the integer pixel.

For example, the second preset precision is less than or equal to the integer pixel. In this case, the motion search manner is used to obtain the motion vector predictor of the current image block provided that the target motion vector precision is less than or equal to the integer pixel. A manner of adjusting motion vector precision is used to obtain the motion vector predictor of the current image block when the target motion vector precision is greater than the integer pixel.

It should be understood that the first preset precision and the second preset precision may be same precision, or may be different precision.

For example, if the second preset precision is the ¼, when the motion vector precision corresponding to the target adjacent image block is the ¼, the motion search manner in the fourth manner is used to determine the motion vector predictor of the current image block. When the specified motion vector precision corresponding to the target adjacent image block is the ½ (or may be precision other than ¼ pixel precision), the manner of adjusting motion vector precision in the third manner is used to determine the motion vector predictor of the current image block.

In this application, the motion search manner with specific precision is used to obtain the motion vector predictor of the current image block, so as to more flexibly select, based on different motion vector precision requirements, different manners to determine the motion vector predictor of the current image block.

In some embodiments, the method shown in FIG. 3 further includes: parsing a bitstream to obtain first indication information, where the first indication information is used to indicate the first preset precision; and the determining whether the target motion vector precision is first preset precision includes: determining, based on the first indication information, whether the target motion vector precision is the first preset precision.

In some embodiments, the method shown in FIG. 3 further includes: parsing a bitstream to obtain second indication information, where the second indication information is used to indicate the second preset precision; and the determining whether the target motion vector precision is second preset precision includes: determining, based on the second indication information, whether the target motion vector precision is the second preset precision.

The first indication information and the second indication information can flexibly indicate the first preset precision and the second preset precision.

In some embodiments, the first indication information may be an index value, and there is a specific correspondence between the index value and the first preset precision. The decoder side may parse the bitstream to obtain the index value, and then obtain the first preset precision based on the index value. Subsequently, the decoder side can determine whether the target motion vector precision is the first preset precision.

The correspondence between an index value and first preset precision may be listed in Table 7. As listed in Table 7, index values 0 to 5 are corresponding to different motion vector precision, respectively.

TABLE 7

| Index value | First preset precision |
| --- | --- |
| 0 | ¼ |
| 1 | ½ |
| 2 | 1 |
| 3 | 2 |
| 4 | 4 |
| 5 | 8 |

In addition, when the first preset precision is a value range, the correspondence between an index value and first preset precision may be listed in Table 8. Each of index values 0 to 5 is corresponding to one motion vector precision value range, respectively.

TABLE 8

| Index value | First preset precision |
| --- | --- |
| 0 | Less than or equal to ¼ |
| 1 | Less than or equal to ½ |
| 2 | Less than or equal to 1 |
| 3 | Less than or equal to 2 |
| 4 | Less than or equal to 4 |
| 5 | Less than or equal to 8 |

Similar to the first indication information, the second indication information may also be an index value, and there is a specific correspondence between the index value and the second preset precision. The decoder side may parse the bitstream to obtain the index value, and then obtain the second preset precision based on the index value. Subsequently, the decoder side can determine whether the target motion vector precision is the second preset precision. The correspondence between an index value and second preset precision may also be listed in Table 7 or Table 8.

In some embodiments, the first preset precision or the second preset precision may alternatively be carried in any one of a sequence parameter set, a picture parameter set, or a slice header of the current image block.

Figure 6A:
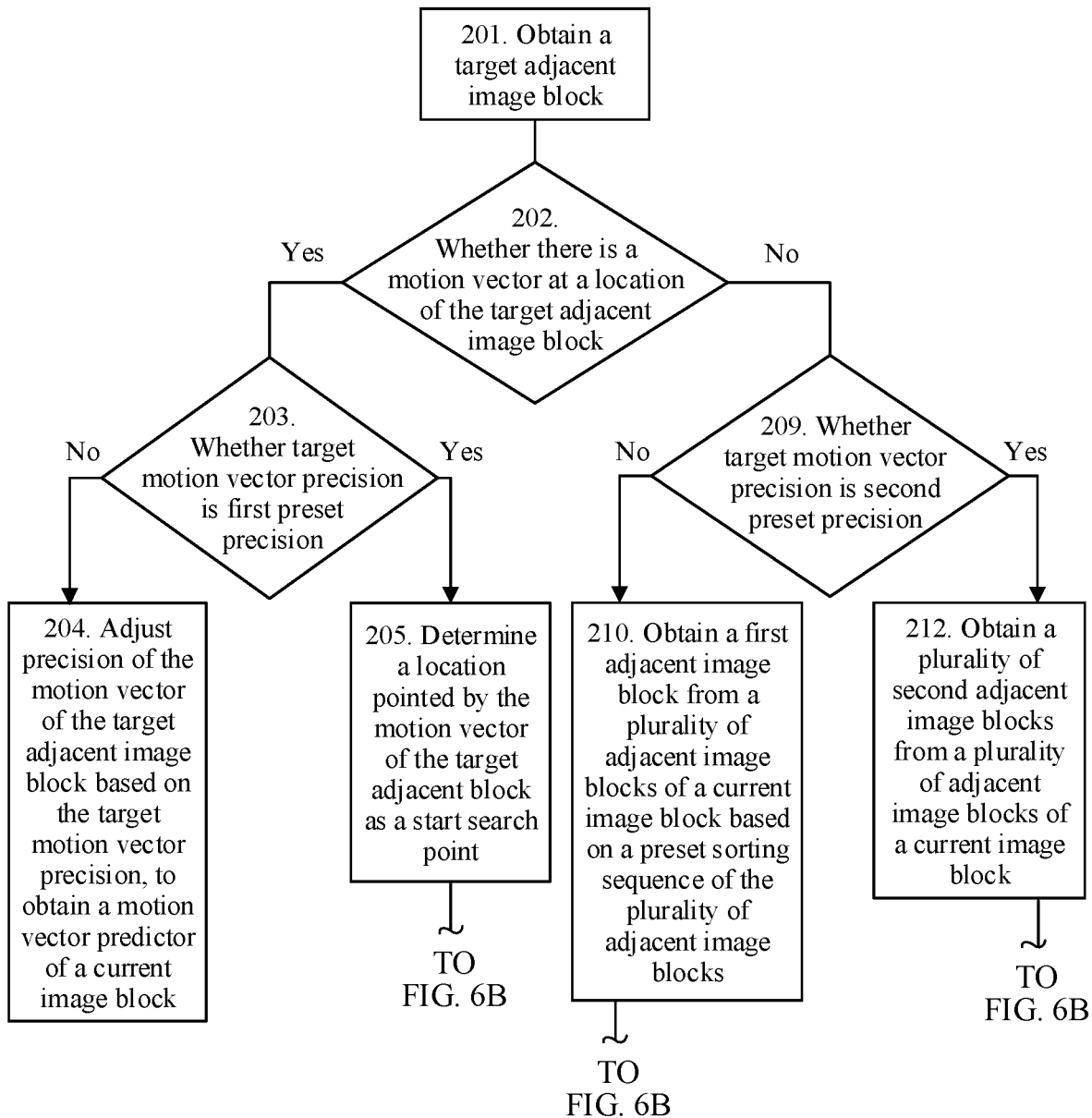
FIG. 6A and FIG. 6B are a flowchart of an inter prediction method according to some embodiments of this application.
Figure 6B:
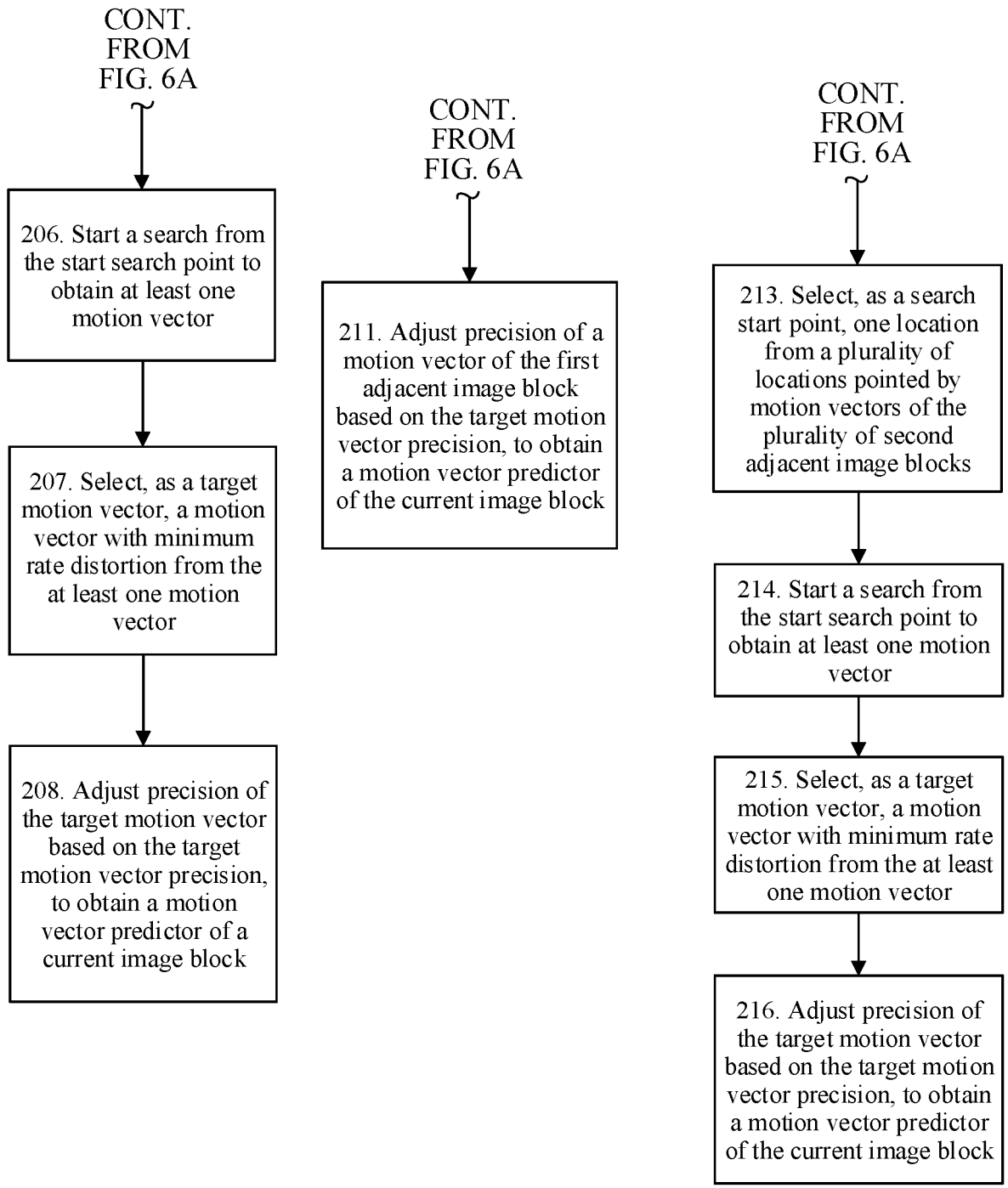

FIG. 6A and FIG. 6B are a flowchart of an inter prediction method according to an embodiment of this application. The method shown in FIG. 6A and FIG. 6B is performed on a decoder side. The method shown in FIG. 6A and FIG. 6B may be performed by a video decoding apparatus, a video decoder, a video encoding and decoding system, or another device having a video decoding function.

The method shown in FIG. 6A and FIG. 6B specifically includes step 201 to step 216. Step 203 to step 208 are a process of obtaining a motion vector predictor of a current image block when a target adjacent image block has a motion vector; step 209 to step 216 are a process of obtaining a motion vector predictor of a current image block when a target adjacent image block has no motion vector. The following separately details step 201 to step 216.

201. Obtain the target adjacent image block.

202. Determine whether there is a motion vector at a location of the target adjacent image block.

Step 203 is performed when there is a motion vector at the location of the target adjacent image block; or step 209 is performed when there is no motion vector at the location of the target adjacent image block.

203. Determine whether target motion vector precision is first preset precision.

Step 204 is performed when the target motion vector precision is the first preset precision; or step 205 to step 208 are performed when the target motion vector precision is not the first preset precision.

In some embodiments, when the target adjacent image block has a motion vector, determining may not be performed by using step 203, but step 204 is directly performed or step 205 to step 208 are directly performed.

204. Adjust precision of the motion vector of the target adjacent image block based on the target motion vector precision, to obtain the motion vector predictor of the current image block.

In step 204, the precision of the motion vector of the target adjacent image block may be first adjusted to the target motion vector precision, and the adjusted motion vector is directly determined as the motion vector predictor of the current image block. When the precision of the motion vector of the target adjacent image block is the target motion vector precision, the precision of the motion vector of the target adjacent image block may not be adjusted, and the motion vector of the target adjacent image block is directly determined as the motion vector predictor of the current image block.

205. Determine a location pointed by the motion vector of the target adjacent image block as a start search point.

206. Start a search from the start search point to obtain at least one motion vector.

207. Select, as a target motion vector, one motion vector from the at least one motion vector.

208. Adjust precision of the target motion vector based on the target motion vector precision, to obtain the motion vector predictor of the current image block.

It should be understood that a process of obtaining the motion vector predictor of the current image block in step 208 is similar to that in step 204. Details are not described herein again.

209. Determine whether target motion vector precision is second preset precision.

Both the second preset precision and the first preset precision herein may be preset specific precision, and the first preset precision and the second preset precision may be identical or different.

210. Obtain a first adjacent image block from a plurality of adjacent image blocks of the current image block based on a preset sorting sequence of the plurality of adjacent image blocks.

It should be understood that the first adjacent image block is an image block that has a motion vector among the plurality of adjacent image blocks. In addition, the preset sorting sequence of the plurality of adjacent image blocks is obtained by sorting the plurality of adjacent image blocks in ascending order of motion vector precision corresponding to locations of the plurality of adjacent image blocks.

211. Adjust precision of the motion vector of the first adjacent image block based on the target motion vector precision, to obtain the motion vector predictor of the current image block.

212. Obtain a plurality of second adjacent image blocks from a plurality of adjacent image blocks of the current image block, where the second adjacent image block is an image block that has a motion vector among the plurality of adjacent image blocks.

213. Select, as a start search point, one location from a plurality of locations pointed by motion vectors of the plurality of second adjacent image blocks.

214. Start a search from the start search point to obtain at least one motion vector.

215. Select, as a target motion vector, one motion vector from the at least one motion vector.

216. Adjust precision of the target motion vector based on the target motion vector precision, to obtain the motion vector predictor of the current image block.

In the foregoing steps and processes, when one motion vector is selected as a target motion vector, from the at least one motion vector, a motion vector corresponding to a smallest SAD, SATD, or MSE may specifically be selected as the target motion vector, from the at least one motion vector in a template matching manner.

For specific implementations of the steps in the process shown in FIG. 6A AND FIG. 6B, refer to the foregoing related descriptions. For brevity, details are not described herein again.

For a better understanding of the inter prediction method in this embodiment of this application, the following details the inter prediction method in this embodiment of this application by using specific instances.

It should be understood that an instance 1 and an instance 2 described below are intended to help a person skilled in the art understand the inter prediction method in this embodiment of this application, but are not intended to limit the inter prediction method in this embodiment of this application to specific scenarios and specific execution steps shown in the instance 1 and the instance 2. A person skilled in the art can make various equivalent modifications or alterations based on the instance 1 and the instance 2. These modifications or alterations fall within the scope of the inter prediction method in this embodiment of this application.

Instance 1: Based on whether an adjacent image block is usable, the motion vector predictor is determined by using different manners.

It should be understood that, an adjacent image block is usable when the adjacent image block has a motion vector; an adjacent image block is unusable when the adjacent image block has no motion vector.

Figure 7:
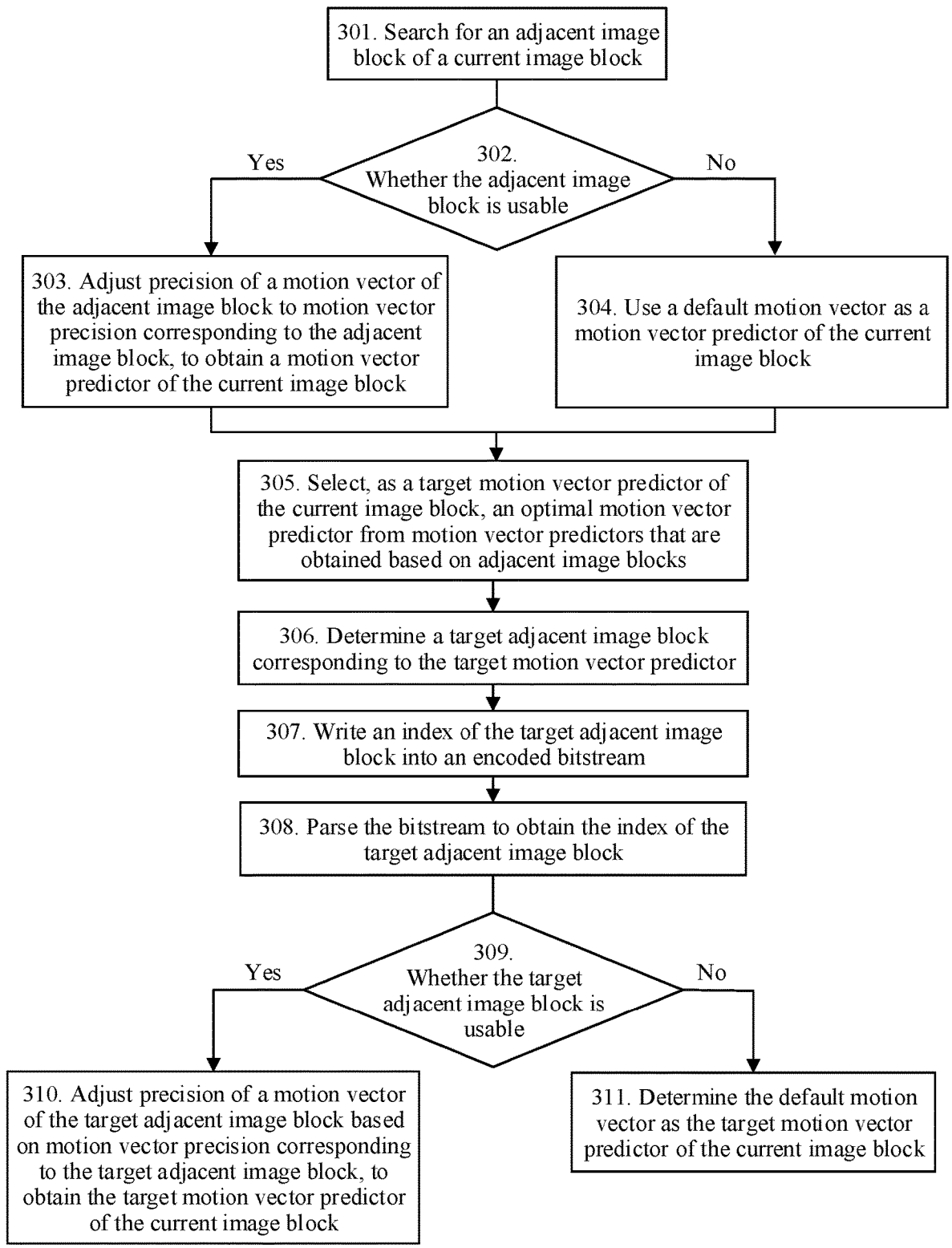
FIG. 7 is a schematic block diagram of an inter prediction method according to some embodiments of this application.

In the instance 1, whether an adjacent image block of the current image block is usable is first determined, and then the motion vector predictor is determined by using different manners. A specific process is shown in FIG. 7. The method shown in FIG. 7 includes step 301 to step 311. Step 301 to step 307 describe a process performed by an encoder side, and step 308 to step 311 describe a process performed by a decoder side. The following separately describes inter prediction from perspectives of the encoder side and the decoder side.

Encoder Side:

For the current image block, the main process of performing inter prediction by the encoder side on the current image block includes step 301 to step 307. The following details step 301 to step 307.

301. Search for an adjacent image block of the current image block.

When the adjacent image block of the current image block is being searched for, the adjacent image block of the current image block may specifically be searched for in ascending order of index values based on Table 9.

TABLE 9

| Index value | Location of an adjacent image block relative to the current image block | Motion vector precision |
|---|---|---|
| 0 | Left | ¼ |
| 1 | Upper | ½ |
| 2 | Upper right | 1 |
| 3 | Upper left | 2 |
| 4 | Same location as the current image block in time domain | 4 |
| 5 | Lower left | 8 |

Table 9 lists a mapping relationship among an adjacent image block of the current image block, motion vector precision, and an index value. The three objects are in a one-to-one correspondence. To be specific, one index value is corresponding to an adjacent image block at one location, and an adjacent image block at one location is corresponding to one motion vector precision value. The motion vector precision herein is required motion vector precision of a motion vector of a corresponding adjacent image block when the motion vector predictor of the current image block is calculated based on the adjacent image block. The motion vector precision listed in Table 9 may specifically be pixel precision. For example, ¼ in Table 9 indicates that motion vector precision is ¼ pixel precision, and 2 indicates that motion vector precision is 2-pixel precision.

The mapping relationship among an index value, an adjacent image block, and specified motion vector precision in Table 9 may be preset on the encoder side and the decoder side; or may be determined by the encoder side, and is transmitted to the decoder side by using a sequence parameter set (sequence parameter set, SPS), a picture parameter set (picture parameter set, PPS), and a slice header.

302. Determine whether the adjacent image block of the current image block is usable.

After step 302 is performed, step 303 is performed if it is determined that the current adjacent image block is usable; or step 304 is performed if it is determined that the current adjacent image block is unusable.

303. Adjust precision of a motion vector of the adjacent image block to motion vector precision corresponding to the adjacent image block, to obtain the motion vector predictor (MVP) of the current image block.

For example, an adjacent image block with an index value 0 is usable, and precision of a motion vector corresponding to the adjacent image block is integer pixel precision. In this case, the precision of the motion vector of the adjacent image block may be adjusted to ¼ pixel precision, and an adjusted motion vector is used as the motion vector predictor of the current image block.

304. Use a default motion vector as the motion vector predictor of the current image block.

The default motion vector in step 304 may be a motion vector generated by the encoder side according to a preset rule. Specifically, the default motion vector may be generated by using the following methods.

First method: A DMVD method is used to obtain the default motion vector.

Using a DMVD method to obtain the default motion vector specifically includes the following steps.

(1) Obtain specified motion vector precision corresponding to an unusable adjacent image block.

For example, if an adjacent image block with an index value 1 is unusable, motion vector precision of the unusable adjacent image block that is obtained based on Table 9 is ½ pixel precision.

(2) Perform derivation by using a decoder side motion vector derivation (decoder side motion vector derivation, DMVD) method, to obtain the default motion vector.

Specifically, a motion vector obtained through derivation by using the DMVD method may be used as the default motion vector, which may be represented by using Formula (2):

$$\text{Default\_MV} = \text{MV\_DMVD(idx)} \qquad (2)$$

In Formula (2), MV_DMVD(idx) is the motion vector obtained through derivation by using the DMVD method, and Default_MV is the default motion vector. In Formula (2), the motion vector obtained through derivation by using the DMVD method is used as the default motion vector.

A specific process of obtaining the motion vector through derivation by using the DMVD method includes:

first, determining the motion vector precision corresponding to the unusable adjacent image block as target precision;

next, obtaining a start search point MV list (that is, a motion vector of a candidate block that may be understood as a motion vector of an adjacent image block) based on the target precision;

then, selecting an optimal start search point from the MV list based on the target precision through template matching; and finally, starting a search from the optimal start search point based on the target precision, to obtain an optimal MV.

In the first method, the DMVD method can be used to derive the relatively accurate motion vector, so as to finally improve accuracy of inter prediction.

To obtain the default motion vector more simply, a second method may alternatively be used to obtain the default motion vector.

Second method: Precision of a motion vector of a usable adjacent image block is adjusted to the specified motion vector precision corresponding to the unusable adjacent image block, to obtain the default motion vector.

The obtaining the default motion vector based on the motion vector of the usable adjacent image block specifically includes:

(1) determining the motion vector precision of the unusable adjacent image block as target precision;

(2) obtaining the motion vector of the usable adjacent image block; and (3) scaling the motion vector of the usable adjacent image block to reach the target precision, and determining a scaled motion vector as the default motion vector.

Specifically, the motion vector of the usable adjacent image block may be scaled to reach the target precision by using Formula (3), so as to obtain the default motion vector. In addition, the usable adjacent image block herein may be any one of all usable adjacent image blocks of the current image block, or may be the found first usable adjacent image block following the unusable adjacent image block:

$$\text{Default\_MV} = ((\text{MV\_available} >> \text{idx}) << \text{idx}) \qquad (3)$$

In Formula (3), MV_available is the motion vector of the usable adjacent image block of the current image block, Default_MV is the default motion vector, and idx is both an index value of the unusable adjacent image block and a quantity of shifted bits.

305. Select, as a target motion vector predictor of the current image block, an optimal motion vector predictor from motion vector predictors that are obtained based on adjacent image blocks.

The optimal motion vector predictor may be selected from a plurality of motion vector predictors based on rate distortion or in another manner. This is not limited in this application. Any manner that can be used to select the optimal motion vector predictor from a plurality of motion vector predictors falls within the protection scope of this application.

306. Determine a target adjacent image block corresponding to the target motion vector predictor.

307. Write an index value of the target adjacent image block into an encoded bitstream.

Decoder Side:

For the current image block, the main process of performing inter prediction by the decoder side on the current image block includes step 308 to step 311. The following details step 308 to step 311.

308. Parse the bitstream to obtain the index value of the target adjacent image block.

The bitstream in step 308 may be the encoded bitstream finally obtained by the encoder side in step 307, and the bitstream may be transmitted by the encoder side.

309. Determine whether the target adjacent image block is usable.

Step 310 is performed if the target adjacent image block is usable; or step 311 is performed if the target adjacent image block is unusable.

310. Adjust precision of a motion vector of the target adjacent image block based on motion vector precision corresponding to the target adjacent image block, to obtain the target motion vector predictor of the current image block.

It should be understood that in step 310, a scaled motion vector is used as the target motion vector predictor of the current image block.

311. Determine the default motion vector as the target motion vector predictor of the current image block.

It should be understood that the default motion vector in step 311 may be generated by using the first method or the second method used in step 304.

In the instance 1, the motion vector predictor can be determined based on whether an adjacent image block is usable, and the default motion vector can be used as the motion vector predictor of the current image block when the adjacent image block is unusable. In other words, in the instance 1, the motion vector predictor of the current image block can be obtained based on a usable adjacent image block, or the motion vector predictor of the current image block can be obtained based on an unusable adjacent image block. In this way, the target motion vector predictor of the current image block can be determined more properly.

Instance 2: A motion vector is derived by using the DMVD method with some precision, and a motion vector is directly scaled with some other precision.

Encoder Side:

For the current image block, the main process of performing inter prediction by the encoder side on the current image block includes step 401 to step 406. The following details step 401 to step 406.

401. Determine motion vector precision corresponding to an adjacent image block.

Specifically, motion vector precision corresponding to adjacent image blocks may successively be determined in ascending order of index values based on Table 10.

TABLE 10

| Index value | Location of an adjacent image block relative to the current image block | Motion vector precision |
|---|---|---|
| 0 | Left | ¼ |
| 1 | Upper | ½ |
| 2 | Upper right | 1 |
| 3 | Upper left | 2 |
| 4 | Same location as the current image block in time domain | 4 |
| 5 | Lower left | 8 |

402. Determine whether the motion vector precision corresponding to the adjacent image block is preset motion vector precision.

Step 403 is performed if the motion vector precision corresponding to the adjacent image block is the preset motion vector precision; or step 404 is performed if the motion vector precision corresponding to the adjacent image block is not the preset motion vector precision.

403. Derive a target motion vector predictor of the current image block by using the DMVD method and based on the motion vector precision corresponding to the adjacent image block.

404. Adjust precision of a motion vector of the adjacent image block to the motion vector precision corresponding to the adjacent image block, to obtain a motion vector predictor of the current image block.

Because there are a plurality of adjacent image blocks of the current image block, a plurality of motion vector predictors can be obtained after step 403 and step 404 are performed.

405. Select the target motion vector predictor of the current image block from the plurality of motion vector predictors obtained by using step 403 and step 404, and determine a target adjacent image block corresponding to the target motion vector predictor.

406. Write a target index value corresponding to the target adjacent image block into an encoded bitstream.

407. Write indication information into the bitstream, where the indication information is used to indicate whether the DMVD method is used to derive a motion vector with motion vector precision corresponding to each index value.

Decoder Side:

For the current image block, the main process of performing inter prediction by the decoder side on the current image block includes step 407 to step 410. The following details step 407 to step 410.

407. Parse the bitstream to obtain the index value and the indication information.

408. Query Table 10 based on the index value, to obtain motion vector precision corresponding to the target adjacent image block corresponding to the target index value.

409. Determine, based on the indication information, whether to use the DMVD method to derive a motion vector with the motion vector precision corresponding to the target adjacent image block.

410. If the indication information indicates that the DMVD method is used to derive the motion vector with the specified motion vector precision corresponding to the obtained index value, derive the target motion vector predictor of the current image block by using the DMVD method and based on the motion vector precision corresponding to the target adjacent image block; otherwise, adjust precision of a motion vector of the target adjacent image block based on the motion vector precision corresponding to the target adjacent image block, to obtain the motion vector predictor of the current image block.

The indication information may specifically be represented by forms shown in Table 11 and Table 12. As listed in Table 11, seq_parameter_set_rbsp( ) indicates all parameter information of an image sequence, a value of sps_dmvd_precision is used to indicate the indication information, and a descriptor u(2) indicates that there are two bits used for encoding the indication information.

TABLE 11

| | Descriptor (descriptor) |
|---|---|
| seq_parameter_set_rbsp( ) { | |
| ... | |
| sps_dmvd_precision | u(2) |
| ... | |
| } | |

Specifically, as listed in Table 12, for example, when the value of sps_dmvd_precision is 0, it indicates that when motion vector precision is a ¼ pixel, the DMVD method is used to derive the motion vector; with other motion vector precision, a precision adjustment method is used to obtain the motion vector predictor of the current image block.

TABLE 12

| sps_dmvd_precision | Motion vector precision |
|---|---|
| 0 | ¼ |
| 1 | ½ |
| 2 | 1 |
| 3 | 2 |

In some embodiments, the indication information may specifically be represented by forms shown in Table 13 and Table 14. As listed in Table 13, pic_parameter_set_rbsp( ) indicates all parameter information of an image, a value of pps_dmvd_precision is used to indicate the indication information, and a descriptor u(2) indicates that there are two bits used for encoding the indication information.

TABLE 13

| | Descriptor (descriptor) |
|---|---|
| pic_parameter_set_rbsp( ) { | |
| ... | |
| pps_dmvd_precision | u(2) |
| ... | |
| } | |

Specifically, as listed in Table 14, for example, when the value of pps_dmvd_precision is 2, it indicates that when motion vector precision is an integer pixel, the DMVD method is used to derive the motion vector; with other motion vector precision, a precision adjustment method is used to obtain the motion vector predictor of the current image block.

TABLE 14

| pps_dmvd_precision | Motion vector precision |
|---|---|
| 0 | ¼ |
| 1 | ½ |
| 2 | 1 |
| 3 | 2 |

In some embodiments, the indication information may specifically be represented by forms shown in Table 15 and Table 16. As listed in Table 15, slice_segment_header( ) indicates all parameter information of a slice header of an image, a value of slice_dmvd_precision is used to indicate the indication information, and a descriptor u(2) indicates that there are two bits used for encoding the indication information.

TABLE 15

| | Descriptor (descriptor) |
|---|---|
| slice_segment_header( ) { | |
| ... | |
| slice_dmvd_precision | u(2) |
| ... | |
| } | |

Specifically, as listed in Table 16, for example, when the value of slice_dmvd_precision is 1, it indicates that when motion vector precision is a ½ pixel, the DMVD method is used to derive the motion vector; with other motion vector precision, a precision adjustment method is used to obtain the motion vector predictor of the current image block.

TABLE 16

| slice_dmvd_precision | Motion vector precision |
|---|---|
| 0 | ¼ |
| 1 | ½ |
| 2 | 1 |
| 3 | 2 |

It should be understood that in Table 11 to Table 16, specific values of sps_dmvd_precision, pps_dmvd_precision, and slice_dmvd_precision indicate that with corresponding motion vector precision, the DMVD method is used to derive the motion vector predictor of the current image block; with motion vector precision other than the corresponding motion vector precision, the DMVD method is not used to derive the motion vector.

In some embodiments, specific values of sps_dmvdprecision, pps_dmvd_precision, and slice_dmvd_precision may alternatively indicate that when specific motion vector precision is less than or equal to corresponding motion vector precision, the DMVD method is used to derive the motion vector predictor of the current image block; when the specific motion vector precision is greater than the corresponding motion vector precision, the DMVD method is not used to derive the motion vector.

For example, the indication information may specifically be represented by forms shown in Table 17 and Table 18. As listed in Table 17, seq_parameter_set_rbsp( ) indicates all parameter information of an image sequence, a value of sps_dmvd_precision is used to indicate the indication information, and a descriptor u(2) indicates that there are two bits used for encoding the indication information.

TABLE 17

| | Descriptor (descriptor) |
|---|---|
| seq_parameter_set_rbsp( ) { | |
| ... | |
| sps_dmvd_precision | u(2) |
| ... | |
| } | |

Specifically, as listed in Table 18, for example, when the value of sps_dmvd_precision is 1, it indicates that when motion vector precision is less than or equal to a ½ pixel, the DMVD method is used to derive the motion vector; with other motion vector precision, a precision adjustment method is used to obtain the motion vector predictor of the current image block.

TABLE 18

| sps_dmvd_precision | Motion vector precision |
|---|---|
| 0 | Less than or equal to ¼ |
| 1 | Less than or equal to ½ |
| 2 | Less than or equal to 1 |
| 3 | Less than or equal to 2 |

It should be understood that in Tables 11, 13, 15, and 17, a value of the descriptor is determined based on a total quantity of precision that is to be indicated by the indication information. For example, when a total quantity of precision that is to be indicated by the indication information is two, the descriptor may be u(1), and in this case, it indicates that one bit is used for encoding the indication information. When a total quantity of precision that is to be indicated by the indication information is more than four, the descriptor may be u(3), and in this case, it indicates that three bits are used for encoding the indication information.

Figure 8:
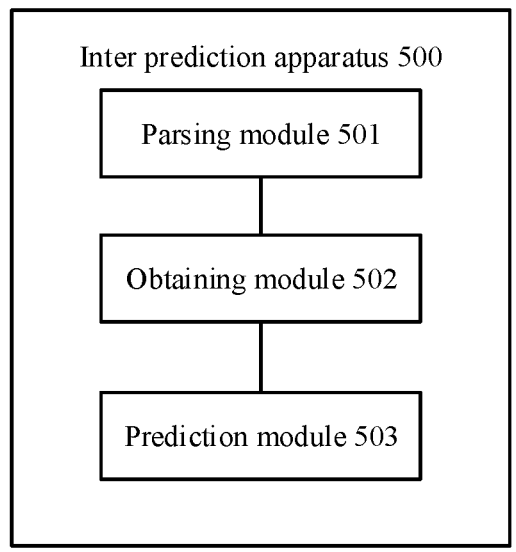
FIG. 8 is a schematic block diagram of an inter prediction apparatus according to some embodiments of this application.

The foregoing details the inter prediction method in the embodiments of this application with reference to FIG. 1 to FIG. 7, and the following describes an inter prediction apparatus in the embodiments of this application with reference FIG. 8. It should be understood that the inter prediction apparatus in FIG. 8 can perform the inter prediction method in the embodiments of this application. For brevity, repeated descriptions are properly omitted when the following describes the inter prediction apparatus in the embodiments of this application.

FIG. 8 is a schematic flowchart of an inter prediction apparatus according to an embodiment of this application. The inter prediction apparatus 500 in FIG. 8 can perform the steps of the inter prediction methods shown in FIG. 3, FIG. 6A and FIG. 6B, and FIG. 7 in this application.

The inter prediction apparatus 500 specifically includes:

a parsing module 501, configured to parse a bitstream to obtain a location of a target adjacent image block of a current image block;

an obtaining module 502, configured to obtain a preset correspondence between an adjacent image block location and motion vector precision, where in the correspondence, locations of at least two adjacent image blocks are corresponding to different motion vector precision; and a prediction module 503, configured to determine, based on the location of the target adjacent image block and the correspondence, target motion vector precision corresponding to the target adjacent image block, where the prediction module 503 is further configured to determine a motion vector predictor of the current image block based on the location of the target adjacent image block and the target motion vector precision.

In this application, after the location of the target adjacent image block is obtained, the target motion vector precision corresponding to the target adjacent image block may be determined directly based on the correspondence between an adjacent image block location and motion vector precision, and then motion vector prediction can be performed based on the location of the target adjacent image block and the target motion vector precision. This can reduce complexity of inter prediction.

In some embodiments, in an embodiment, in the correspondence, a location of an $i^{th}$ adjacent image block is corresponding to $j^{th}$ motion vector precision, the $j^{th}$ motion vector precision is motion vector precision that is most frequently used when image motion vector prediction is performed at the location of the $i^{th}$ adjacent image block within a preset statistical period, and the $i^{th}$ adjacent image block is any one of a plurality of adjacent image blocks corresponding to a to-be-predicted image block.

In some embodiments, in an embodiment, the prediction module 503 is specifically configured to: when there is a motion vector at the location of the target adjacent image block, adjust precision of the motion vector of the target adjacent image block based on the target motion vector precision, to obtain an adjusted motion vector, where precision of the adjusted motion vector is the target motion vector precision; and determine the adjusted motion vector as the motion vector predictor of the current image block.

In some embodiments, in an embodiment, the prediction module 503 is specifically configured to: when there is a motion vector at the location of the target adjacent image block, determine whether precision of the motion vector of the target adjacent image block is the target motion vector precision; and when the precision of the motion vector of the target adjacent image block is the target motion vector precision, determine the motion vector of the target adjacent image block as the motion vector predictor of the current image block; or when the precision of the motion vector of the target adjacent image block is not the target motion vector precision, adjust the precision of the motion vector of the target adjacent image block based on the target motion vector precision, to obtain an adjusted motion vector, where precision of the adjusted motion vector is the target motion vector precision; and determine the adjusted motion vector as the motion vector predictor of the current image block.

In some embodiments, in an embodiment, the prediction module 503 is specifically configured to: when there is a motion vector at the location of the target adjacent image block, determine a location pointed by the motion vector of the target adjacent image block as a start search point; start a search from the start search point to obtain at least one motion vector; select, as a target motion vector, one motion vector from the at least one motion vector; adjust precision of the target motion vector based on the target motion vector precision, to obtain an adjusted target motion vector, where precision of the adjusted target motion vector is the target motion vector precision; and determine the adjusted target motion vector as the motion vector predictor of the current image block.

In some embodiments, in an embodiment, the prediction module 503 is specifically configured to: determine whether the target motion vector precision is first preset precision; and when the target motion vector precision is not the first preset precision, adjust precision of a motion vector of the target adjacent image block based on the target motion vector precision, to obtain an adjusted motion vector, where precision of the adjusted motion vector is the target motion vector precision; and determine the adjusted motion vector as the motion vector predictor of the current image block; or when the target motion vector precision is the first preset precision, determine a location pointed by a motion vector of the target adjacent image block as a start search point;

start a search from the start search point to obtain at least one motion vector;

select, as a target motion vector, one motion vector from the at least one motion vector;

adjust precision of the target motion vector based on the target motion vector precision, to obtain an adjusted target motion vector, where precision of the adjusted target motion vector is the target motion vector precision; and determine the adjusted target motion vector as the motion vector predictor of the current image block.

In some embodiments, in an embodiment, the prediction module 503 is specifically configured to:

when there is no motion vector at the location of the target adjacent image block, obtain a first adjacent image block from a plurality of adjacent image blocks of the current image block based on a preset sorting sequence of the plurality of adjacent image blocks, where the preset sorting sequence of the plurality of adjacent image blocks is obtained by sorting the plurality of adjacent image blocks in ascending order or in descending order of motion vector precision corresponding to locations of the plurality of adjacent image blocks, and the first adjacent image block is an image block that has a motion vector among the plurality of adjacent image blocks;

adjust precision of the motion vector of the first adjacent image block based on the target motion vector precision, to obtain an adjusted motion vector, where precision of the adjusted motion vector is the target motion vector precision; and determine the adjusted motion vector as the motion vector predictor of the current image block.

In some embodiments, in an embodiment, the prediction module 503 is specifically configured to:

when there is no motion vector at the location of the target adjacent image block, obtain a plurality of second adjacent image blocks from adjacent image blocks of the current image block, where the second adjacent image block is an image block that has a motion vector among the adjacent image blocks of the current image block;

select, as a start search point, one location from a plurality of locations pointed by motion vectors of the plurality of second adjacent image blocks;

start a search from the start search point to obtain at least one motion vector;

select, as a target motion vector, one motion vector from the at least one motion vector;

adjust precision of the target motion vector based on the target motion vector precision, to obtain an adjusted target motion vector, where precision of the adjusted target motion vector is the target motion vector precision; and determine the adjusted target motion vector as the motion vector predictor of the current image block.

In some embodiments, in an embodiment, the prediction module 503 is specifically configured to:

determine whether the target motion vector precision is second preset precision; and when the target motion vector precision is not the second preset precision, obtain a first adjacent image block from a plurality of adjacent image blocks of the current image block based on a preset sorting sequence of the plurality of adjacent image blocks, where the first adjacent image block is an image block that has a motion vector among the plurality of adjacent image blocks;

adjust precision of the motion vector of the first adjacent image block based on the target motion vector precision, to obtain an adjusted motion vector, where precision of the adjusted motion vector is the target motion vector precision; and determine the adjusted motion vector as the motion vector predictor of the current image block; or when the target motion vector precision is the second preset precision, obtain a plurality of second adjacent image blocks from a plurality of adjacent image blocks of the current image block, where the second adjacent image block is an image block that has a motion vector among the plurality of adjacent image blocks;

select, as a start search point, one location from a plurality of locations pointed by motion vectors of the plurality of second adjacent image blocks;

start a search from the start search point to obtain at least one motion vector;

select, as a target motion vector, one motion vector from the at least one motion vector;

adjust precision of the target motion vector based on the target motion vector precision, to obtain an adjusted target motion vector, where precision of the adjusted target motion vector is the target motion vector precision; and determine the adjusted target motion vector as the motion vector predictor of the current image block.

Figure 9:
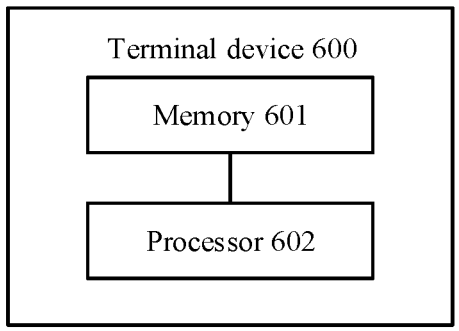
FIG. 9 is a schematic block diagram of a terminal device according to some embodiments of this application.

FIG. 9 is a schematic block diagram of a terminal device according to an embodiment of this application. The terminal device 600 in FIG. 9 includes:

a memory 601, configured to store a program; and a processor 602, configured to execute the program stored in the memory 601, where when the program is executed, the processor 602 is configured to perform the inter prediction methods in the embodiments of this application.

Specifically, when the program stored in the memory 601 is executed, the processor 602 can perform the steps of the inter prediction methods shown in FIG. 3 and FIG. 6A and FIG. 6B.

In addition, the inter prediction apparatus 500 may be a component of the terminal device 600. In this case, the inter prediction apparatus 500 may be a module that is in the terminal device 600 and that is specially configured to perform inter prediction on a video image.

Figure 10:
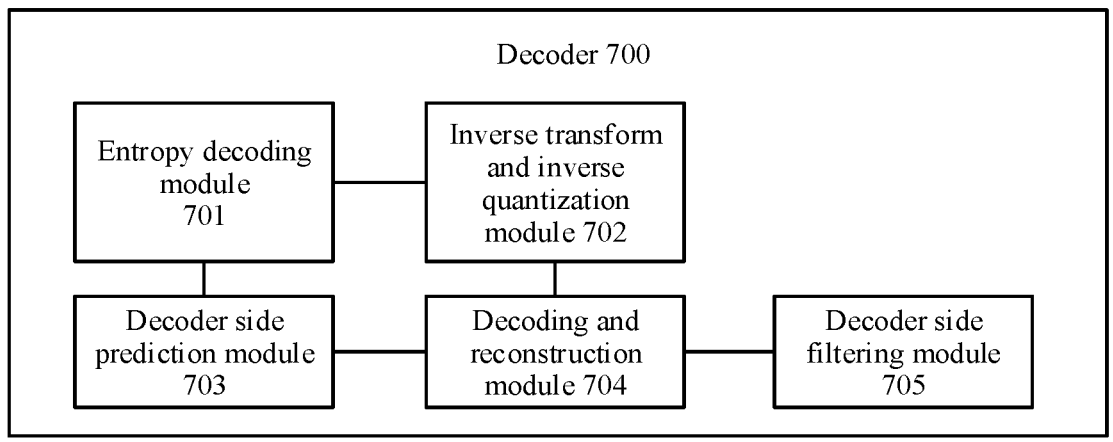
FIG. 10 is a schematic block diagram of a decoder according to some embodiments of this application.

FIG. 10 is a schematic block diagram of a decoder according to an embodiment of this application.

The decoder 700 in FIG. 10 includes an entropy decoding module 701, an inverse transform and inverse quantization module 702, a decoder side prediction module 703, a decoding and reconstruction module 704, and a decoder side filtering module 705.

The decoder 700 may be specifically a video decoder. The decoder 700 can decode a video image. However, the inter prediction method in the embodiments of this application may be an intermediate process of decoding the video image. Therefore, the decoder 700 may perform the inter prediction method in the embodiments of this application. Specifically, when the decoder 700 performs the inter prediction method in the embodiments of this application, the decoder side prediction module 705 in the decoder 700 may specifically perform the inter prediction method. In other words, the decoder side prediction module 705 in the decoder 700 is equivalent to the inter prediction apparatus 500, and the decoder side prediction module 705 can perform any action or step performed by the inter prediction apparatus 500.

Figure 11:
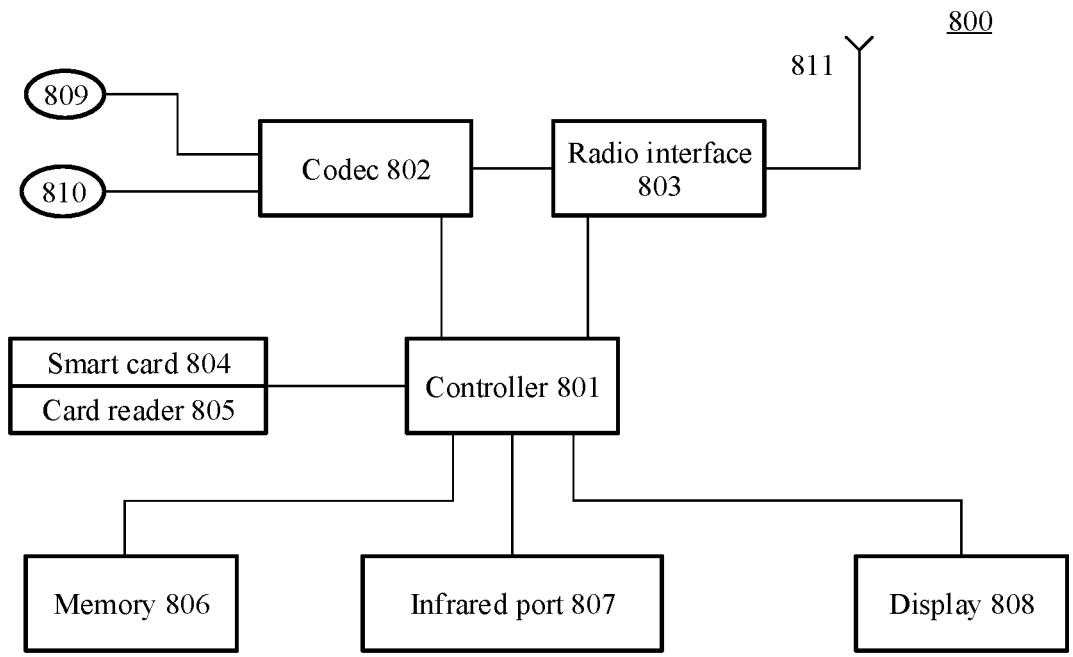
FIG. 11 is a schematic block diagram of an encoding and decoding apparatus according to some embodiments of this application.

FIG. 11 is a schematic diagram of a video encoding and decoding apparatus according to an embodiment of this application. The video encoding and decoding apparatus 800 may be an apparatus that is specially configured to encode and/or decode a video image, or an electronic device having a video encoding and decoding function. Further, the video encoding and decoding apparatus 800 may be a mobile terminal or user equipment of a wireless communications system.

The encoding and decoding apparatus 800 may include the following modules or units: a controller 801, a codec 802, a radio interface 803, an antenna 44, a smart card 804, a card reader 805, a memory 806, an infrared port 807, and a display 808. In addition to the modules and the units shown in FIG. 11, the encoding and decoding apparatus 800 may include a microphone or any appropriate audio input module. The audio input module may input a digital signal or an analog signal. The encoding and decoding apparatus 800 may further include an audio output module. The audio output module may be an earphone, a speaker, or an analog audio output connection or a digital audio output connection. The encoding and decoding apparatus 800 may further include a battery. The battery may be a solar cell, a fuel cell, or the like. The encoding and decoding apparatus 800 may further include an infrared port configured to perform short-range line-of-sight communication with another device. The encoding and decoding apparatus 800 may further communicate with the another device in any appropriate short-range communication mode, for example, a Bluetooth wireless connection or a USB/live line wired connection.

The memory 806 may store data in a form of image and data in a form of audio, and may also store an instruction to be executed on the controller 801.

The codec 802 may encode and decode audio data and/or video data or implement, under the control of the controller 801, assisted encoding and assisted decoding on audio data and/or video data.

The smart card 804 and the card reader 805 may provide user information and may also provide authentication information of network authentication and an authorized user. Specific implementation forms of the smart card 804 and the card reader 805 may be a universal integrated circuit card (universal integrated circuit card, UICC) and a UICC reader.

The radio interface 803 may generate a wireless communication signal. The wireless communication signal may be a communication signal generated during communication in a cellular communications network, a wireless communications system, or a wireless local area network.

The antenna 811 is configured to send, to another apparatus (there may be one or more apparatuses), a radio frequency signal that is generated on the radio interface 803, and may be further configured to receive a radio frequency signal from another apparatus (there may be one or more apparatuses).

In some embodiments of this application, the encoding and decoding apparatus 800 may receive to-be-processed video image data from another device before transmission and/or storage. In some other embodiments of this application, the encoding and decoding apparatus 800 may receive an image through a wireless or wired connection and encode/decode the received image.

Figure 12:
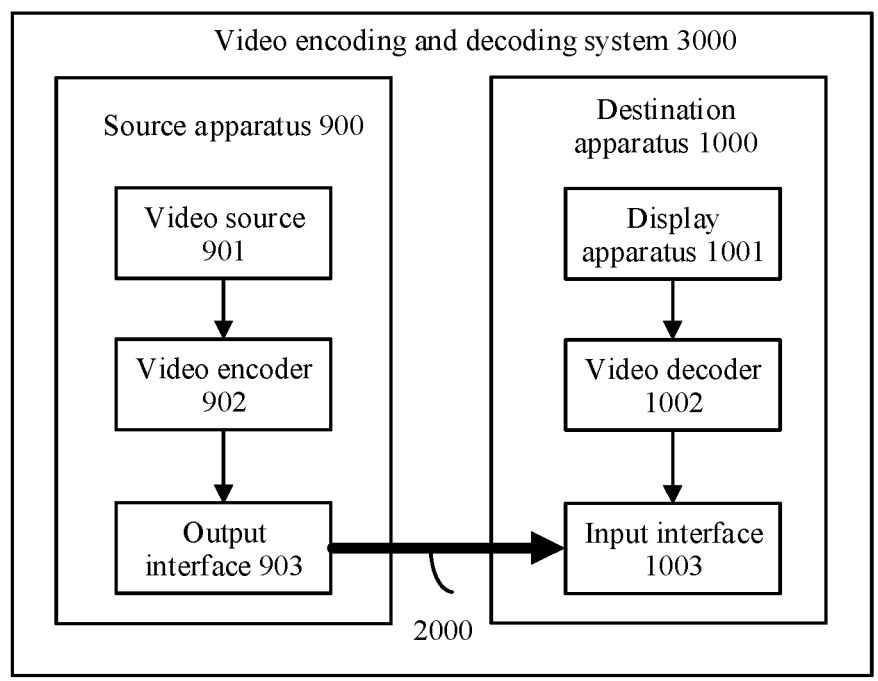
FIG. 12 is a schematic block diagram of a video encoding and decoding system according to some embodiments of this application.

FIG. 12 is a schematic block diagram of a video encoding and decoding system 3000 according to an embodiment of this application.

As shown in FIG. 12, the video encoding and decoding system 3000 includes a source apparatus 900 and a destination apparatus 1000. The source apparatus 900 generates encoded video data. The source apparatus 900 may also be referred to as a video encoding apparatus or a video encoding device. The destination apparatus 1000 may decode the encoded video data generated by the source apparatus 900. The destination apparatus 1000 may also be referred to as a video decoding apparatus or a video decoding device.

Specific implementation forms of the source apparatus 900 and the destination apparatus 1000 may be any one of the following devices: a desktop computer, a mobile computing apparatus, a notebook (for example, laptop) computer, a tablet computer, a set top box, a smartphone, a handset, a television, a camera, a display apparatus, a digital media player, a video game console, an in-vehicle computer, or other similar devices.

The destination apparatus 1000 may receive the encoded video data from the source apparatus 900 through a channel 2000. The channel 2000 may include one or more media and/or apparatuses that can move the encoded video data from the source apparatus 900 to the destination apparatus 1000. In an example, the channel 2000 may include one or more communications media that can enable the source apparatus 900 to directly transmit the encoded video data to the destination apparatus 1000 in real time. In this example, the source apparatus 900 may modulate the encoded video data according to a communications standard (for example, a wireless communications protocol) and may transmit the modulated video data to the destination apparatus 1000. The one or more communications media may include wireless and/or wired communications media, for example, a radio frequency (radio frequency, RF) spectrum or one or more physical transmission lines. The one or more communications media may form a part of a packet-based network (for example, a local area network, a wide area network, or a global network (for example, the internet)). The one or more communications media may include a router, a switch, a base station, or another device implementing communication between the source apparatus 900 and the destination apparatus 1000.

In another example, the channel 2000 may include a storage medium that stores the encoded video data generated by the source apparatus 900. In this example, the destination apparatus 1000 may access the storage medium through disk access or card access. The storage medium may include a plurality of locally accessible data storage media such as Blu-ray, a high-density digital video disc (digital video disc, DVD), a compact disc read-only memory (compact disc read-only memory, CD-ROM), or a flash memory, or another suitable digital storage medium configured to store the encoded video data.

In another example, the channel 2000 may include a file server or another intermediate storage apparatus that stores the encoded video data generated by the source apparatus 900. In this example, the destination apparatus 1000 may access, through streaming transmission or downloading, the encoded video data stored in the file server or the another intermediate storage apparatus. The file server may be of a server type that can store the encoded video data and transmit the encoded video data to the destination apparatus 1000. For example, the file server may include a world wild web (world wide web, Web) server (for example, used for a website), a file transfer protocol (file transfer protocol, FTP) server, a network attached storage (network attached storage, NAS) apparatus, and a local disk drive.

The destination apparatus 1000 may access the encoded video data through a standard data connection (for example, an internet connection). An example type of the data connection includes a radio channel that is suitable for accessing the encoded video data stored in the file server, a wired connection (for example, a cable modem), or a combination of the radio channel and the wired connection. The encoded video data may be transmitted from the file server through the streaming transmission, the downloading transmission, or a combination thereof.

The image prediction method in this application is not limited to a wireless application scenario. For example, the image prediction method in this application may be applied to video encoding and decoding supporting a plurality of multimedia applications such as the following applications: over-the-air television broadcasting, cable television transmission, satellite television transmission, streaming-transmission video transmission (for example, by means of the internet), encoding of video data stored in a data storage medium, decoding of video data stored in a data storage medium, or another application. In some examples, the video encoding and decoding system 3000 may be configured to support unidirectional or bidirectional video transmission, so as to support applications such as video streaming transmission, video play, video broadcasting, and/or videotelephony.

In FIG. 12, the source apparatus 900 includes a video source 901, a video encoder 902, and an output interface 903. In some examples, the output interface 903 may include a modulator/demodulator (a modem) and/or a transmitter. The video source 901 may include a video capturing apparatus (for example, a video camera), a video archive including pre-captured video data, a video input interface configured to receive video data from a video content provider, and/or a computer graphics system configured to generate video data, or a combination of the foregoing video data sources.

The video encoder 902 may encode video data from the video source 901. In some examples, the source apparatus 900 directly transmits the encoded video data to the destination apparatus 1000 by using the output interface 903. The encoded video data may be further stored in a storage medium or a file server, so that the destination apparatus 1000 accesses the encoded video data later for decoding and/or playing.

In FIG. 12, the destination apparatus 1000 includes an input interface 1003, a video decoder 1002, and a display apparatus 1001. In some examples, the input interface 1003 includes a receiver and/or a modem. The input interface 1003 may receive the encoded video data through the channel 2000. The display apparatus 1001 may be integrated with the destination apparatus 1000 or may be outside the destination apparatus 1000. Usually, the display apparatus 1001 displays decoded video data. The display apparatus 1001 may include a plurality of types of display apparatuses such as a liquid crystal display, a plasma display, an organic light-emitting diode display, or a display apparatus of another type.

The video encoder 902 and the video decoder 1002 may operate according to a video compression standard (for example, a high efficiency video coding H.265 standard), and may comply with a high efficiency video coding (high efficiency video coding, HEVC) test model (HM). Text description ITU-TH.265 (V3) (April 2015) of the H.265 standard is released on Apr. 29, 2015, and may be downloaded from http://handle.itu.int/11.1002/3000/12455. The file is incorporated in this specification by reference in its entirety.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and units, reference may be made to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit a protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. An inter prediction method, comprising:
 parsing, by a processor, a bitstream to obtain a location of a target adjacent image block of a current image block;

obtaining a preset correspondence between an adjacent image block location and a motion vector precision, wherein in the preset correspondence, locations of at least two adjacent image blocks correspond to different motion vector precisions;

determining, by a decoder, based on the location of the target adjacent image block and the preset correspondence, a target motion vector precision corresponding to the target adjacent image block; and determining, by the decoder, a motion vector predictor of the current image block based on the location of the target adjacent image block and the target motion vector precision, wherein the determining, by the decoder, the motion vector predictor of the current image block based on the location of the target adjacent image block and the target motion vector precision comprises:

obtaining a first adjacent image block from a plurality of adjacent image blocks of the current image block based on a preset sorting sequence of the plurality of adjacent image blocks, and the first adjacent image block is an image block that has a motion vector among the plurality of adjacent image blocks in response to the target motion vector precision failing to be a second preset precision.

2. The method according to claim 1, wherein in the preset correspondence, a location of an $i^{th}$ adjacent image block corresponds to a $i^{th}$ motion vector precision, the $j^{th}$ motion vector precision is the motion vector precision that is most frequently used in response to image motion vector prediction being performed at the location of the $i^{th}$ adjacent image block within a preset statistical period, and the $i^{th}$ adjacent image block is one of a plurality of adjacent image blocks corresponding to a to-be-predicted image block.

3. The method according to claim 1, wherein the determining the motion vector predictor of the current image block based on the location of the target adjacent image block and the target motion vector precision comprises:

adjusting a precision of a motion vector of the target adjacent image block based on the target motion vector precision, thereby obtaining an adjusted motion vector in response to the motion vector being at the location of the target adjacent image block, wherein a precision of the adjusted motion vector is the target motion vector precision; and determining the adjusted motion vector as the motion vector predictor of the current image block.

4. The method according to claim 1, wherein the determining the motion vector predictor of the current image block based on the location of the target adjacent image block and the target motion vector precision includes:

determining whether a precision of a motion vector of the target adjacent image block is the target motion vector precision in response to the motion vector being at the location of the target adjacent image block; and determining the motion vector of the target adjacent image block as the motion vector predictor of the current image block in response to the precision of the motion vector of the target adjacent image block being the target motion vector precision; or adjusting the precision of the motion vector of the target adjacent image block based on the target motion vector precision, thereby obtaining an adjusted motion vector in response to the precision of the motion vector of the target adjacent image block failing to be the target motion vector precision, wherein a precision of the adjusted motion vector is the target motion vector precision; and determining the adjusted motion vector as the motion vector predictor of the current image block.

5. The method according to claim 1, wherein the determining the motion vector predictor of the current image block based on the location of the target adjacent image block and the target motion vector precision comprises:

determining a location pointed by a motion vector of the target adjacent image block as a start search point in response to the motion vector being at the location of the target adjacent image block;

starting a search from the start search point thereby obtaining at least one motion vector;

selecting, as a target motion vector, one motion vector from the at least one motion vector;

adjusting a precision of the target motion vector based on the target motion vector precision, thereby obtaining an adjusted target motion vector, wherein a precision of the adjusted target motion vector is the target motion vector precision; and determining the adjusted target motion vector as the motion vector predictor of the current image block.

6. The method according to claim 1, wherein the determining the motion vector predictor of the current image block based on the location of the target adjacent image block and the target motion vector precision comprises:

determining whether the target motion vector precision is a first preset precision; and in response to the target motion vector precision failing to be the first preset precision, the determining the motion vector predictor of the current image block based on the location of the target adjacent image block and the target motion vector precision further comprises:

adjusting a precision of a motion vector of the target adjacent image block based on the target motion vector precision, thereby obtaining an adjusted motion vector, wherein a precision of the adjusted motion vector is the target motion vector precision; and determining the adjusted motion vector as the motion vector predictor of the current image block; or in response to the target motion vector precision being the first preset precision, the determining the motion vector predictor of the current image block based on the location of the target adjacent image block and the target motion vector precision further comprises:

determining a location pointed by a motion vector of the target adjacent image block as a start search point;

starting a search from the start search point thereby obtaining at least one motion vector;

selecting, as a target motion vector, one motion vector from the at least one motion vector;

adjusting a precision of the target motion vector based on the target motion vector precision, thereby obtaining an adjusted target motion vector, wherein a precision of the adjusted target motion vector is the target motion vector precision; and determining the adjusted target motion vector as the motion vector predictor of the current image block.

7. The method according to claim 1, wherein the determining the motion vector predictor of the current image block based on the location of the target adjacent image block and the target motion vector precision comprises:

obtaining a first adjacent image block from a plurality of adjacent image blocks of the current image block based on a preset sorting sequence of the plurality of adjacent image blocks in response to the location of the target adjacent image block failing to include a motion vector, wherein the first adjacent image block is an image block that has a motion vector among the plurality of adjacent image blocks;

adjusting a precision of the motion vector of the first adjacent image block based on the target motion vector precision thereby obtaining an adjusted motion vector, wherein a precision of the adjusted motion vector is the target motion vector precision; and determining the adjusted motion vector as the motion vector predictor of the current image block.

8. The method according to claim 1, wherein the determining the motion vector predictor of the current image block based on the location of the target adjacent image block and the target motion vector precision comprises:

obtaining a plurality of second adjacent image blocks from adjacent image blocks of the current image block in response to the location of the target adjacent image block failing to include a motion vector, wherein a second adjacent image block of the plurality of second adjacent image blocks is an image block that has a motion vector among the adjacent image blocks of the current image block;

selecting, as a start search point, one location from a plurality of locations pointed by motion vectors of the plurality of second adjacent image blocks;

starting a search from the start search point thereby obtaining at least one motion vector;

selecting, as a target motion vector, one motion vector from the at least one motion vector;

adjusting a precision of the target motion vector based on the target motion vector precision, thereby obtaining an adjusted target motion vector, wherein a precision of the adjusted target motion vector is the target motion vector precision; and determining the adjusted target motion vector as the motion vector predictor of the current image block.

9. The method according to claim 1, wherein the determining the motion vector predictor of the current image block based on the location of the target adjacent image block and the target motion vector precision further comprises:

determining whether the target motion vector precision is a second preset precision; and in response to the target motion vector precision failing to be the second preset precision, the determining the motion vector predictor of the current image block based on the location of the target adjacent image block and the target motion vector precision further comprises:

adjusting a precision of the motion vector of the first adjacent image block based on the target motion vector precision, thereby obtaining an adjusted motion vector, wherein a precision of the adjusted motion vector is the target motion vector precision; and determining the adjusted motion vector as the motion vector predictor of the current image block; or in response to the target motion vector precision being the second preset precision, the determining the motion vector predictor of the current image block based on the location of the target adjacent image block and the target motion vector precision further comprises:

obtaining a plurality of second adjacent image blocks from a plurality of adjacent image blocks of the current image block, wherein a second adjacent image block of the plurality of second adjacent image blocks is an image block that has a motion vector among the plurality of adjacent image blocks;

selecting, as a start search point, one location from a plurality of locations pointed by motion vectors of the plurality of second adjacent image blocks;

starting a search from the start search point thereby obtaining at least one motion vector;

selecting, as a target motion vector, one motion vector from the at least one motion vector;

adjusting a precision of the target motion vector based on the target motion vector precision, thereby obtaining an adjusted target motion vector, wherein a precision of the adjusted target motion vector is the target motion vector precision; and determining the adjusted target motion vector as the motion vector predictor of the current image block.

10. An inter prediction apparatus, comprising:

a processor configured to parse a bitstream to obtain a location of a target adjacent image block of a current image block; and the processor being further configured to obtain a preset correspondence between an adjacent image block location and a motion vector precision, wherein in the preset correspondence, locations of at least two adjacent image blocks correspond to different motion vector precisions; and a predictor, configured to determine, based on the location of the target adjacent image block and the preset correspondence, a target motion vector precision corresponding to the target adjacent image block, wherein the predictor is further configured to determine a motion vector predictor of the current image block based on the location of the target adjacent image block and the target motion vector precision, and obtain a first adjacent image block from a plurality of adjacent image blocks of the current image block based on a preset sorting sequence of the plurality of adjacent image blocks, and the first adjacent image block is an image block that has a motion vector among the plurality of adjacent image blocks in response to the target motion vector precision failing to be the second preset precision.

11. The apparatus according to claim 10, wherein in the preset correspondence, a location of an $i^{th}$ adjacent image block corresponds to a $i^{th}$ motion vector precision, the $j^{th}$ motion vector precision is the motion vector precision that is most frequently used in response to image motion vector prediction being performed at the location of the $i^{th}$ adjacent image block within a preset statistical period, and the $i^{th}$ adjacent image block is one of a plurality of adjacent image blocks corresponding to a to-be-predicted image block.

12. The apparatus according to claim 10, wherein the predictor is further configured to:

adjust a precision of a motion vector of the target adjacent image block based on the target motion vector precision, to obtain an adjusted motion vector in response to the motion vector being at the location of the target adjacent image block, wherein a precision of the adjusted motion vector is the target motion vector precision; and determine the adjusted motion vector as the motion vector predictor of the current image block.

13. The apparatus according to claim 10, wherein the predictor is further configured to:
  determine whether a precision of a motion vector of the target adjacent image block is the target motion vector precision in response to the motion vector being at the location of the target adjacent image block; and
  determine the motion vector of the target adjacent image block as the motion vector predictor of the current image block in response to the precision of the motion vector of the target adjacent image block being the target motion vector precision; or
  adjust the precision of the motion vector of the target adjacent image block based on the target motion vector precision, to obtain an adjusted motion vector in response to the precision of the motion vector of the target adjacent image block failing to be the target motion vector precision, wherein a precision of the adjusted motion vector is the target motion vector precision; and
  determine the adjusted motion vector as the motion vector predictor of the current image block.

14. The apparatus according to claim 10, wherein the predictor is further configured to:
  determine a location pointed by a motion vector of the target adjacent image block as a start search point in response to the motion vector being at the location of the target adjacent image block;
  start a search from the start search point to obtain at least one motion vector;
  select, as a target motion vector, one motion vector from the at least one motion vector;
  adjust a precision of the target motion vector based on the target motion vector precision, to obtain an adjusted target motion vector, wherein a precision of the adjusted target motion vector is the target motion vector precision; and
  determine the adjusted target motion vector as the motion vector predictor of the current image block.

15. The apparatus according to claim 10, wherein the predictor is further configured to:
  determine whether the target motion vector precision is a first preset precision; and
  in response to the target motion vector precision failing to be the first preset precision,
    adjust a precision of a motion vector of the target adjacent image block based on the target motion vector precision, to obtain an adjusted motion vector, wherein a precision of the adjusted motion vector is the target motion vector precision; and
    determine the adjusted motion vector as the motion vector predictor of the current image block; or
  in response to the target motion vector precision being the first preset precision,
    determine a location pointed by a motion vector of the target adjacent image block as a start search point;
    start a search from the start search point to obtain at least one motion vector;
    select, as a target motion vector, one motion vector from the at least one motion vector;
    adjust a precision of the target motion vector based on the target motion vector precision, to obtain an adjusted target motion vector, wherein a precision of the adjusted target motion vector is the target motion vector precision; and
    determine the adjusted target motion vector as the motion vector predictor of the current image block.

16. The apparatus according to claim 10, wherein the predictor is further configured to:
  obtain a first adjacent image block from a plurality of adjacent image blocks of the current image block based on a preset sorting sequence of the plurality of adjacent image blocks in response to the location of the target adjacent image block failing to include a motion vector, wherein the first adjacent image block is an image block that has a motion vector among the plurality of adjacent image blocks;
  adjust a precision of the motion vector of the first adjacent image block based on the target motion vector precision, to obtain an adjusted motion vector, wherein a precision of the adjusted motion vector is the target motion vector precision; and
  determine the adjusted motion vector as the motion vector predictor of the current image block.

17. The apparatus according to claim 10, wherein the predictor is further configured to:
  obtain a plurality of second adjacent image blocks from adjacent image blocks of the current image block in response to the location of the target adjacent image block failing to include a motion vector, wherein a second adjacent image block of the plurality of second adjacent image blocks is an image block that has a motion vector among the adjacent image blocks of the current image block;
  select, as a start search point, one location from a plurality of locations pointed by motion vectors of the plurality of second adjacent image blocks;
  start a search from the start search point to obtain at least one motion vector;
  select, as a target motion vector, one motion vector from the at least one motion vector;
  adjust a precision of the target motion vector based on the target motion vector precision, to obtain an adjusted target motion vector, wherein a precision of the adjusted target motion vector is the target motion vector precision; and
  determine the adjusted target motion vector as the motion vector predictor of the current image block.

18. The apparatus according to claim 10, wherein the predictor is further configured to:
  determine whether the target motion vector precision is second preset precision; and
  in response to the target motion vector precision failing to be the second preset precision,
    adjust a precision of the motion vector of the first adjacent image block based on the target motion vector precision, to obtain an adjusted motion vector, wherein a precision of the adjusted motion vector is the target motion vector precision; and
    determine the adjusted motion vector as the motion vector predictor of the current image block; or
  in response to the target motion vector precision being the second preset precision,
    obtain a plurality of second adjacent image blocks from a plurality of adjacent image blocks of the current image block, wherein a second adjacent image block of the plurality of second adjacent image blocks is an image block that has a motion vector among the plurality of adjacent image blocks;
    select, as a start search point, one location from a plurality of locations pointed by motion vectors of the plurality of second adjacent image blocks;
    start a search from the start search point to obtain at least one motion vector;

select, as a target motion vector, one motion vector from the at least one motion vector;

adjust a precision of the target motion vector based on the target motion vector precision, to obtain an adjusted target motion vector, wherein a precision of the adjusted target motion vector is the target motion vector precision; and determine the adjusted target motion vector as the motion vector predictor of the current image block.

19. A terminal device, comprising:

a memory, configured to store a program; and a processor, configured to execute the program stored in the memory, wherein in response to the program being executed, the processor is configured to:

parse a bitstream to obtain a location of a target adjacent image block of a current image block;

obtain a preset correspondence between an adjacent image block location and a motion vector precision, wherein in the preset correspondence, locations of at least two adjacent image blocks correspond to different motion vector precisions;

determine, based on the location of the target adjacent image block and the preset correspondence, a target motion vector precision corresponding to the target adjacent image block; and determine a motion vector predictor of the current image block based on the location of the target adjacent image block and the target motion vector precision, wherein the determining the motion vector predictor of the current image block based on the location of the target adjacent image block and the target motion vector precision comprises:

obtaining a first adjacent image block from a plurality of adjacent image blocks of the current image block based on a preset sorting sequence of the plurality of adjacent image blocks, and the first adjacent image block is an image block that has a motion vector among the plurality of adjacent image blocks in response to the target motion vector precision failing to be a second preset precision.

20. The terminal device according to claim 19, wherein in the preset correspondence, a location of an $i^{th}$ adjacent image block corresponds to a $j^{th}$ motion vector precision, the $j^{th}$ motion vector precision is the motion vector precision that is most frequently used in response to image motion vector prediction being performed at the location of the $i^{th}$ adjacent image block within a preset statistical period, and the $i^{th}$ adjacent image block is one of a plurality of adjacent image blocks corresponding to a to-be-predicted image block.

* * * * *